United States Patent
Enomoto et al.

(10) Patent No.: US 7,155,114 B2
(45) Date of Patent: Dec. 26, 2006

(54) INFORMATION RECORDING APPARATUS AND METHOD, INFORMATION READING APPARATUS AND METHOD, MAGNETIC TAPE FORMAT, AND RECORDING MEDIUM

(75) Inventors: Takuro Enomoto, Tokyo (JP);
Toshitaka Yoshihiro, Kanagawa (JP);
Tomoo Hayakawa, Kanagawa (JP);
Yoichiro Tauchi, Saitama (JP);
Fumiyoshi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1138 days.

(21) Appl. No.: 09/923,152

(22) Filed: Aug. 6, 2001

(65) Prior Publication Data

US 2002/0076199 A1    Jun. 20, 2002

(30) Foreign Application Priority Data

Aug. 7, 2000   (JP) .............................. 2000-238109
Jan. 9, 2001   (JP) .............................. 2001-001916

(51) Int. Cl.
*H04N 5/913* (2006.01)
(52) U.S. Cl. .......................... 386/131; 386/44; 386/33; 386/1; 386/109; 386/111; 386/112; 348/441
(58) Field of Classification Search .................... 386/1, 386/45, 69, 70, 95
See application file for complete search history.

(56) References Cited

U.S. PATENT DOCUMENTS 5,377,051 A * 12/1994 Lane et al. .................... 386/81
5,568,328 A   10/1996 Takahashi et al.
5,583,653 A * 12/1996 Timmermans ............... 386/125
5,646,695 A *  7/1997 Fujiwara et al. ............. 348/448
5,691,819 A * 11/1997 Uchida et al. ............... 386/109
6,081,648 A *  6/2000 Sugiyama ..................... 386/68

FOREIGN PATENT DOCUMENTS

EP   0 629 085   12/1994
EP   0 771 122   5/1997

* cited by examiner

Primary Examiner—Thai Q. Tran
Assistant Examiner—Helen Shibru
(74) Attorney, Agent, or Firm—Frommer Lawrence & Haug LLP; William S. Frommer; Paul A. Levy

(57) ABSTRACT

An information recording apparatus for recording information on a predetermined recording medium includes a creation unit for creating search data from main image data; and a recording unit for recording the search data created by the creation unit and the main image data on the recording medium, wherein the creation unit creates first data by which an image can be displayed over one entire one screen, and second data for enhancing the image quality of the image displayed by the first data each as the search data, and the recording unit records the first data and the second data in a predetermined sequence.

39 Claims, 22 Drawing Sheets

FIG. 14

| ITEM | bit | REMARKS |
|---|---|---|
| SB X ADDRESS | 7 | X COORDINATE OF START MACRO BLOCK IN SYNC BLOCK |
| RESERVED | 1 | RESERVED |
| SB Y ADDRESS | 7 | Y COORDINATE OF START MACRO BLOCK IN SYNC BLOCK |
| RESERVED | 1 | RESERVED |
| PICTURE CLASS ID | 1 | 0 : BASE DATA, 1 : HELPER DATA |
| PICTURE CHANGE COUNTER | 2 | INDICATES DIFFERENT SEARCH IMAGE |
| PACKET HEADER | 5 | PACKET HEADER OF INFORMATION OF SEARCH IMAGE |
| PACKET DATA | 16 | PACKET DATA OF INFORMATION OF SEARCH IMAGE |

FIG. 15

| PACKET HEADER | CONTENTS | L/H | REMARKS |
|---|---|---|---|
| 0 | SH | L | SEARCH HEADER |
| 1 | SH | H | SEARCH HEADER |
| 2 | TTC | L | ↑ CONTENT OF SUBCODE |
| 3 | TTC | H | |
| 4 | REC TIME | L | |
| 5 | REC TIME | H | |
| 6 | REC DATE | L | |
| 7 | REC DATE | H | |
| 8 | ATN + FLG | L | |
| 9 | ATN + FLG | H | ↓ |
| 10 | PART NO. | L | (FOR RECORDED TAPE) |
| 11 | PART NO. | H | (FOR RECORDED TAPE) |
| 12 | CHAPTER START | L | (FOR RECORDED TAPE) |
| 13 | CHAPTER START | H | (FOR RECORDED TAPE) |
| 14~31 | RESERVED | | RESERVED |

| bit | | CONTENTS | |
|---|---|---|---|
| 0 | NATIVE/TS | A: NATIVE RECORDING 1: TS RECORDING | |
| 1 | REC START FLAG | INDICATES RECORDING STARTING POINT | |
| 2 | CGMS | 00: COPY FREE | 10: COPY ONCE |
| 3 | | 01: RESERVED | 11: COPY INHIBIT |
| 4 | | RESERVED | |
| 5 | | | |
| 6 | | | |
| 7 | P/I | 0: PROGRESSIVE, 1: INTERLACED | |
| 8 | ASPECT RATIO | 0000: FORBIDDEN | 1000: RESERVED |
| 9 | | 0001: 1, 0 | 1001: RESERVED |
| 10 | | 0010: 3/4 | 1010: RESERVED |
| 11 | | 0011: 9/16 | 1011: RESERVED |
| | | 0100: 1/2, 21 | 1100: RESERVED |
| | | 0101: RESERVED | 1101: RESERVED |
| | | 0110: RESERVED | 1110: RESERVED |
| | | 0111: RESERVED | 1111: RESERVED |
| 12 | FRAME RATE | 0000: FORBIDDEN | 1000: 60 |
| 13 | | 0001: 24/1, 01 | 1001: RESERVED |
| 14 | | 0010: 24 | 1010: RESERVED |
| 15 | | 0011: 25 | 1011: RESERVED |
| | | 0100: 30/1, 001 | 1100: RESERVED |
| | | 0101: 30 | 1101: RESERVED |
| | | 0110: 50 | 1110: RESERVED |
| | | 0111: 60/1, 001 | 1111: RESERVED |

SH (H)

| bit | CONTENTS |
|---|---|
| 0 | HORIZONTAL SIZE |
| 1 | |
| 2 | |
| 3 | |
| 4 | |
| 5 | |
| 6 | |
| 7 | NUMBER OF H-SAMPLES/8 (8 bits) |
| 8 | VERTICAL SIZE |
| 9 | |
| 10 | |
| 11 | |
| 12 | |
| 13 | |
| 14 | |
| 15 | NUMBER OF V-SAMPLES/8 (8 bits) |

INFORMATION RECORDING APPARATUS AND METHOD, INFORMATION READING APPARATUS AND METHOD, MAGNETIC TAPE FORMAT, AND RECORDING MEDIUM

BACKGROUND OF THE INVENTION

1. Field of the Invention

The present invention relates to an information recording apparatus and an information recording method, an information reading apparatus and an information reading method, a magnetic tape format, and a recording medium. More particularly, the present invention relates to an information recording apparatus and an information recording method, an information reading apparatus and an information reading method, a magnetic tape format, and a recording medium, by which an entire display screen can be roughly displayed when some of the search data is lost due to tag recording and/or editing, during a pull-in of tracking control for tracing search data, and also when an error occurs during reading.

2. Description of the Related Art

FIG. 1 is a block diagram showing the construction of a conventional recording/reading apparatus 1. Here, a description is given of a case in which, as a representative example, search image data for an 8x-speed search is arranged and displayed with respect to data such that a video of 1440× 1080/60i is compressed in accordance with MP@H-14 where N=15 (that is, 1 GOP (Group of Pictures) is formed of 15 frames).

A microcomputer 11 controls the recording/reading apparatus 1 in accordance with a signal indicating an operation of a user, which is input from an input section 12. The microcomputer 11, for example, generates a control signal for creating a search image in order to output it to a search data creation section 23, generates a control signal for displaying a search image in order to output it to a search image display section 37, generates a control signal for selecting data in order to output it to a switch 22, a switch 35, or a switch 38, and generates a control signal for moving a magnetic tape 30 in a forward/reverse direction in order to outputs it to a capstan motor 15.

A dial 13 and an operation button 14 are connected to the input section 12. The dial 13 is used such that a rotation operation and an operation for pressing in a direction at right angles to the rotation axis (to the right in the figure) are made possible, and is operated by a user. The operation button 14 is, for example, formed of various buttons, such as a recording button and a button for taking up the magnetic tape 30, and outputs a signal indicating the operation content of the user to the input section 12. The input section 12 outputs the signal indicating the operation of the user, which is input from the dial 13 or the operation button 14, to the microcomputer 11.

The capstan motor 15 drives the magnetic tape 30 in accordance with a control signal input from the microcomputer 11.

A video data compression processing section 21 compresses an input video signal in accordance with, for example, MP@H-14 of MPEG2, creates compressed data made up of a plurality of GOPs (GOP0, GOP1, . . . , GOPn) composed of 15 frames, formed of I pictures, B pictures, and P pictures, such as those shown in FIG. 2, and supplies the compressed data to the switch 22 and the search data creation section 23.

The search data creation section 23 creates search data from the compressed image data. That is, the search data creation section 23 extracts I pictures formed of intra-frames from among the I pictures, B pictures, and P pictures of the respective GOP, and creates search image data. From each I picture, search image data for one frame is created.

At this point, search image data created from I pictures in the search data creation section 23 is described with reference to FIG. 3. The number of effective pixels of luminance data of image data before encoding and after decoding is 1440 samples in the horizontal direction and 1080 samples in the vertical direction. Also, the number of effective pixels of color-difference data is 720 samples in the horizontal direction and 540 samples in the vertical direction. One screen of a search image for this image data, as shown in FIG. 3, is formed of 90(=1440÷16) macroblocks (MB) in the horizontal direction and 68 (=1080 ÷16 (rounding up to the next whole number)) macroblocks in the vertical direction. That is, one screen of a search image is formed of 6120 (90×68) macroblocks.

One macroblock is formed of 6 pieces of data of data in which DC components are extracted from each of the luminance signals Y which are divided into 4 DCT blocks of 8 pixels×8 pixels and are converted into 6 bits, and data in which DC components are extracted from each of the color-difference signals Cb and Cr of a DCT block of 8 pixels×8 pixels. That is, one macroblock is formed of 34-bit data.

An audio data compression processing section 24 compresses input audio data and outputs it to the switch 22. The switch 22 selects data from within the data from the video data compression processing section 21, the search data creation section 23, and the audio data compression processing section 24, and the input system data under the control of the microcomputer 11, and outputs it to the error code ID addition section 25.

The error code ID addition section 25 adds error-detection correction codes (parities) C1 and C2 and an ID to the input data, performs an interleaving process between 16 tracks thereon, and outputs it to the sync addition modulation section 26. The sync addition modulation section 26 adds a 16-bit sync pattern indicating the start of the packet to the input data, performs predetermined modulation thereon, and outputs the data to a P/S (Parallel/Serial) conversion section 27.

The P/S conversion section 27 converts the input data from parallel data into serial data, and outputs it to an amplifier 28. The amplifier 28 amplifies the input data and outputs it to a rotary head 29. The rotary head 29 is mounted on a rotary drum (not shown) and causes the input data to be recorded on the magnetic tape 30.

FIG. 4 shows an example of the arrangement of a search image data area for an 8x-speed search. Search image data for 17 sync blocks from SB(0) to SB(16) is inserted into one search image data area. The amount of search picture data of one sync block is 720 bits, and a maximum of 21 macroblocks of 34 bits is contained. Then, a plurality of search image data areas are arranged in such a way that at least 34 sync blocks can be obtained by one trace at intervals of 16 tracks, which are in ECC interleave units.

Then, as shown in FIG. 5, the search image data for 9 traces is arranged across 144 tracks. Here, dummy data is inserted as necessary on the 10th trace so that, on average, one GOP (15 frames) is recorded on the 150 tracks.

In a case where 34 sync blocks can be obtained in one trace, since the number of macroblocks obtained in 9 traces is 6426 macroblocks from 21×34×9, it is possible to obtain data for displaying one screen (composed of 6120 macroblocks) of a search image.

Referring back to FIG. 1, a process for reading data recorded on the magnetic tape 30 is described below.

The data recorded on the magnetic tape 30 is read as an analog electrical signal by the rotary head 29, and this signal is output to the amplifier 31 whereby it is amplified, and is output to an A/D conversion section 32. The A/D conversion section 32 converts the input analog electrical signal into digital data and outputs it to a demodulation section 33. The demodulation section 33 demodulates the input digital data and outputs it to an error-correction ID detection section 34. The error-correction ID detection section 34 performs error correction based on the error-detection correction codes C1 and C2, detects the ID, and performs a deinterleaving process.

Then, as for the data output from the error-correction ID detection section 34, based on a sync block header, the video data is output to the video data decompression section 36, the search image data is output to the search image display section 37, and the audio data is output to the switch 38, via the switch 35. Also, the subcode data and the AUX data are output as system data via the switch 35.

During normal reading, the video data decompression section 36 decompresses input video data, converts the data from digital data into analog data if necessary, and outputs it, via a switch 38, to a monitor 39 formed of, for example, a liquid-crystal panel, whereby the data is displayed. During a search, the search image display section 37 temporarily stores the obtained search data, performs image processing on the stored data in order to create search image data, and can store it in a buffer provided therein. The search image display section 37 converts the search image data stored in the buffer from digital data into analog data if necessary, and outputs it to the monitor 39 via the switch 38, on which the data is displayed.

Also, in a photo-taking mode, image data which is being taken from an image capturing section (for example, a CCD camera) (not shown) to the monitor 39, and the image data which is being taken by the image capturing section is displayed on the monitor 39.

The switch 38 performs a process for switching, under the control of the microcomputer 11, the data which is output to the monitor 39 and is displayed thereon between the data which is output from the video data decompression section 36 and the data which is output from the search image display section 37.

The audio data decompression section 40 decompresses the input audio data, converts the data from digital data to analog data if necessary, and causes the data to be output from a speaker 41.

However, in a case where new data is overwritten on recorded data as a result of editing and/or a tag recording being performed on the magnetic tape 30 on which data is prerecorded, for example, a GOP with 3 or 6 frames, which is shorter than a normal one, may occur. This is because a tag recording and/or editing in units of 3 frames are made possible in the recording/reading apparatus 1.

For example, when GOP1 is overwritten in the 4th and subsequent frames of GOP0, as shown in FIG. 6, the picture of GOP0, which is made to remain on the magnetic tape 30 after a tag recording and/or editing, becomes only the 3rd frame. Also, when GOP1 is overwritten on the 10th and subsequent frames of GOP0, as shown in FIG. 7, the picture of GOP0, which is made to remain on the magnetic tape 30 after a tag recording and/or editing, becomes only the 6th frame.

More specifically, in the cases shown in FIGS. 6 and 7, some of the search image data of GOP0, which is the lower part, to put it in detail, some of the ECC interleave units for 9 tracks, where the search image data is arranged, will be lost. In such a case, the search image to be displayed will become very poor, such as a part of the lower portion of the screen being not displayed.

Furthermore, during a pull-in of tracking control for tracing search data and also when an error occurs during reading, since search image data is not available for one screen, a case may occur in which a portion of the screen is not displayed.

SUMMARY OF THE INVENTION

The present invention has been made in view of such circumstances. Objects of the present invention are to allow the entire display screen to be roughly displayed when some of the search data is lost due to tag recording and editing, during a pull-in of tracking control for tracing search data, and also when an error occurs during reading, and to improve the image quality according to the amount of information of the obtained search data.

To achieve the above-mentioned objects, in one aspect, the present invention provides an information recording apparatus comprising: creation means for creating search data from main image data; and recording means for recording the search data created by the creation means and the main image data on a recording medium, wherein the creation means creates first data by which an image can be displayed over one entire one screen, and second data for enhancing the image quality of the image displayed by the first data, each being used as the search data, and the recording means records the first data and the second data in a predetermined sequence.

The recording means may record the second data after the first data is recorded.

The creation means may create each of the first data and the second data in such a manner so as to be divided into a plurality of portions in predetermined units.

The predetermined units may be units of blocks in which error checking is performed.

The creation means may create the second data corresponding to the central portion of one screen of the image, and at least one piece of the second data corresponding to a portion which is outside the central portion, and the recording means may record a plurality of pieces of the second data in a sequence from the data corresponding to the central portion of one screen of the image to the data corresponding to a portion outside the central portion.

The recording means may record the first data in the predetermined units in such a manner as to be obtained by one trace during reading.

The search data may be composed of image data and control data, the control data may have a packet structure in which a search header and subcode data which is the same as the main image data are written in such a manner so as to be divided, and the packet header of the packet structure may indicate which data is written in the control data.

In another aspect, the present invention provides an information recording method comprising: a creation step for creating search data from main image data; and a recording step for recording the search data created in the creation step and the main image data on a recording medium, wherein, in the creation step, first data by which an image can be displayed over one entire one screen and second data for enhancing the image quality of the image displayed by the first data, each being used as the search data, are created, and in the recording step, the first data and the second data are recorded in a predetermined sequence.

In another aspect, the present invention provides a first recording medium having recorded thereon a program, the program comprising: a creation step for creating search data from main image data; and a recording step for recording the search data created in the creation step and the main image data on a recording medium, wherein, in the creation step, first data by which an image can be displayed over one entire one screen, and second data for enhancing the image quality of the image displayed by the first data, each being used as the search data, are created, and in the recording step, the first data and the second data are recorded in a predetermined sequence.

In another aspect, the present invention provides an information reading apparatus comprising: acquiring means for acquiring search data, which is composed of image data and control data, recorded on a recording medium; and display control means for controlling the display position of the image data on the basis of coordinate information contained in the control data.

The information reading apparatus may further comprise interpolation means for interpolating a display image by using the search data obtained by the acquiring means when the search data obtained by the acquiring means is less than the required amount of data for one screen of the display image.

In another aspect, the present invention provides an information reading method comprising: an acquiring step for acquiring search data, which is composed of image data and control data, recorded on a recording medium; and a display control step for controlling a display position of the image data on the basis of coordinate information contained in the control data.

In another aspect, the present invention provides a second recording medium having recorded thereon a program, the program comprising: an acquiring step for acquiring search data, which is composed of image data and control data, recorded on the recording medium; and a display control step for controlling a display position of the image data on the basis of coordinate information contained in the control data.

In another aspect, the present invention provides a magnetic tape format, in which main image data and search data created from the main image data are recorded, and the search data is composed of first data by which an image can be displayed over one entire one screen, and second data for enhancing the image quality of the image displayed by the first data.

After the first data, the second data which corresponds thereto may be recorded.

The first data and the second data may be each recorded in such a manner so as to be divided into a plurality of portions in predetermined units.

The predetermined units may be units of blocks in which error checking is performed.

The second data corresponding to the central portion of one screen of the image and at least one piece of the second data corresponding to a portion outside the central portion may be recorded in a sequence from the data corresponding to the central portion to the data corresponding to the outside portion.

The first data in the predetermined units may be recorded in such a manner as to be obtained by one trace during reading.

The search data may be composed of image data and control data, and the control data may have a packet structure in which search headers and subcode data which is the same as the main image data are written in such a manner so as to be divided, and the packet header of the packet structure may indicate which data is written in the control data.

In the information recording apparatus, the information recording method, and the program recorded on the first recording medium in accordance with the present invention, search data is created from main image data, the created search data and the main image data are recorded on a recording medium, each of first data by which an image can be displayed over one entire one screen, and second data for enhancing the image quality of the image displayed by the first data is created as search data, and these are recorded in a predetermined sequence. Therefore, for example, even when some of the search data is lost due to a tag recording and/or editing, if at least the first data has been obtained, it is possible to create search data by which the entire display screen can be roughly displayed and to record the search data onto a recording medium.

In the information reading apparatus, the information reading method, and the program recorded on the second recording medium in accordance with the present invention, search data, composed of image data and control data, which is recorded on a recording medium, is obtained, and the display position of the image data is controlled based on the coordinate information contained in the control data. Therefore, for example, when some of the search data is lost due to a tag recording and/or editing, it is possible to roughly display the entire display screen by using only the obtained data.

In the magnetic tape format in accordance with the present invention, main image data, and search data created from the main image data are recorded, and the search data is composed of first data by which an image can be displayed over one entire one screen, and second data for enhancing the image quality of the image displayed by the first data. Therefore, for example, when some of the search data is lost due to a tag recording and/or editing, if at least the first data has been obtained during reading, it is possible to record the search data by which the entire display screen can be roughly displayed.

The above and further objects, aspects and novel features of the invention will become more fully apparent from the following detailed description when read in conjunction with the accompanying drawings.

BRIEF DESCRIPTION OF THE DRAWINGS

FIG. 14 is a table illustrating the content of a search sync block header;

FIG. 15 is a table illustrating the structure of packet data;

FIG. 16 is a table illustrating search header information;

DESCRIPTION OF THE PREFERRED EMBODIMENTS

The embodiments of the present invention will now be described below with reference to the attached drawings.

Figure 8:
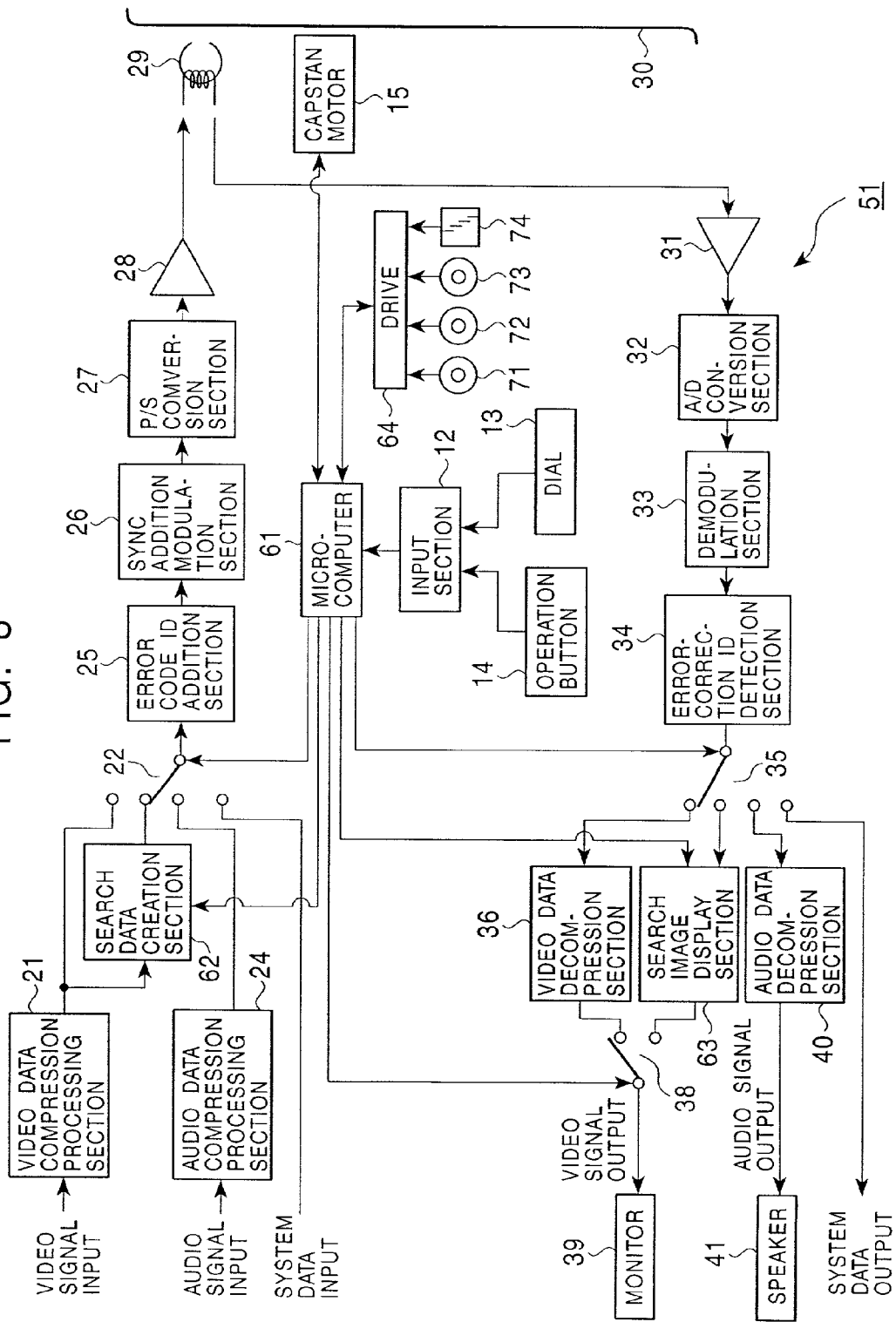
FIG. 8 is a block diagram showing the construction of a recording/reading apparatus to which the present invention is applied.

FIG. 8 is a block diagram showing the construction of a recording/reading apparatus 51 to which the present invention is applied. Components in FIG. 8 corresponding to those in the conventional case are given the same reference numerals, and descriptions thereof are omitted where appropriate.

Figure 1:
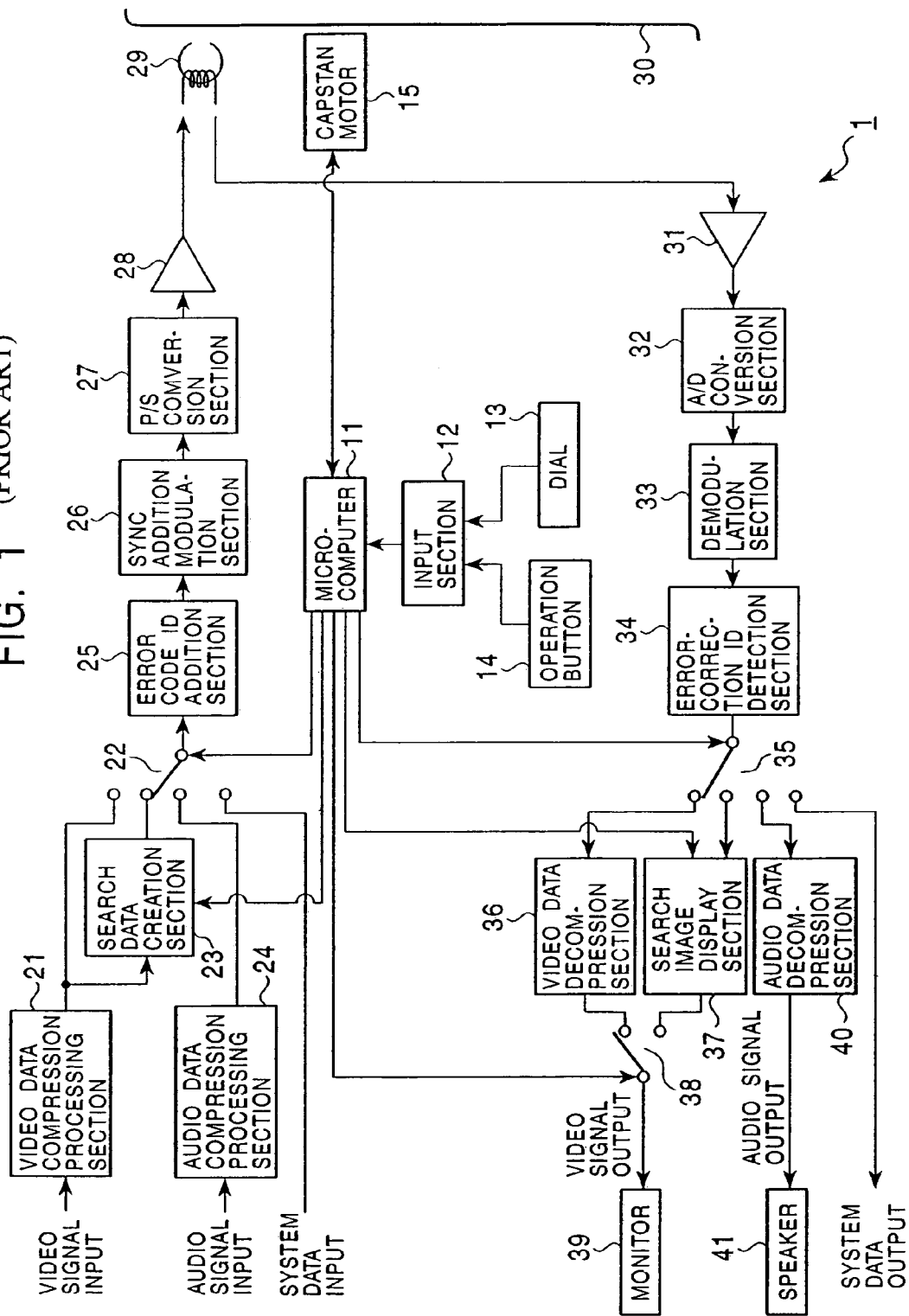
FIG. 1 is a block diagram showing the construction of a conventional recording/reading apparatus.
Figure 2:
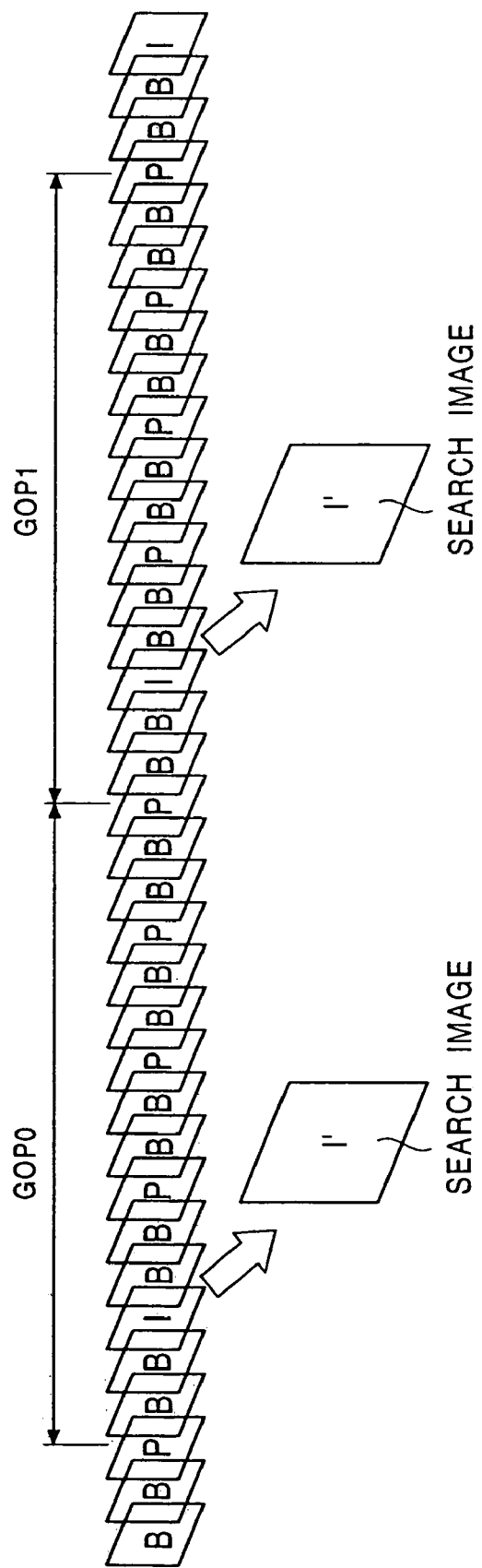
FIG. 2 is a diagram illustrating search image data.

More specifically, the recording/reading apparatus 51 of FIG. 8 basically has the same construction as the recording/reading apparatus 1 described using FIG. 1, except that, in place of the microcomputer 11, a microcomputer 61 is provided, in place of the search data creation section 23, a search data creation section 62 is provided, in place of the search image display section 37, a search image display section 63 is provided, and a drive 64 is newly provided.

The microcomputer 61 controls each section of the recording/reading apparatus 51. The search data creation section 62 extracts I pictures from data input from the video data compression processing section 21, and creates, from the I pictures, search image data for base data and search image data for helper data.

Figure 3:
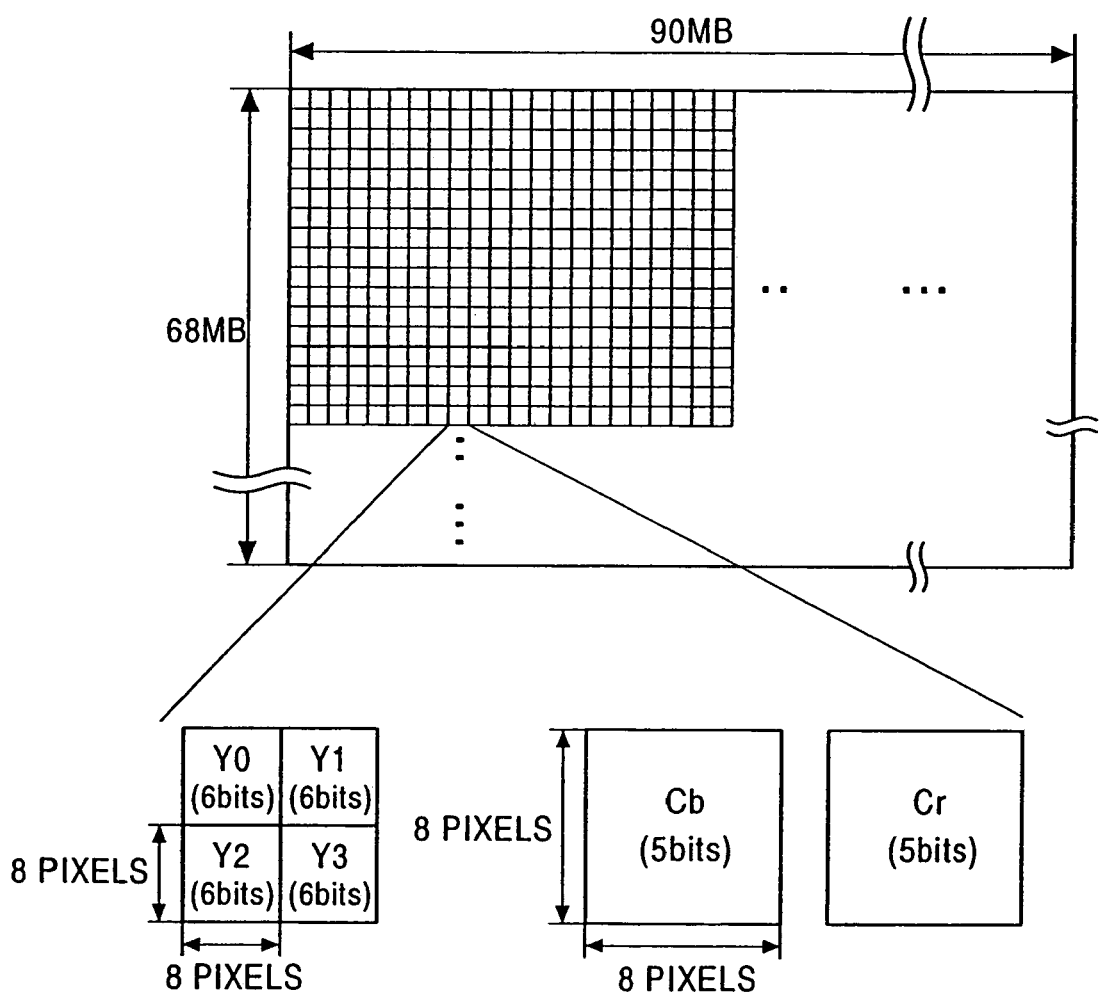
FIG. 3 is a diagram illustrating a macroblock.

As described using FIG. 3, a conventional macroblock of search image data is formed of 6 pieces of data such that DC components are extracted from each of the luminance signals Y0 to Y3 which are divided into 4 DCT blocks of 8 pixels×8 pixels and are converted into 6 bits, and data such that DC components are extracted from each of color-difference signals Cb and Cr of a DCT block of 8 pixels×8 pixels and are each converted into 5 bits. Here, two types of the search image data are created by the search data creation section 62, which are a macroblock for base data shown in FIG. 9A, and a macroblock for helper data shown in FIG. 9B.

Figure 9A:
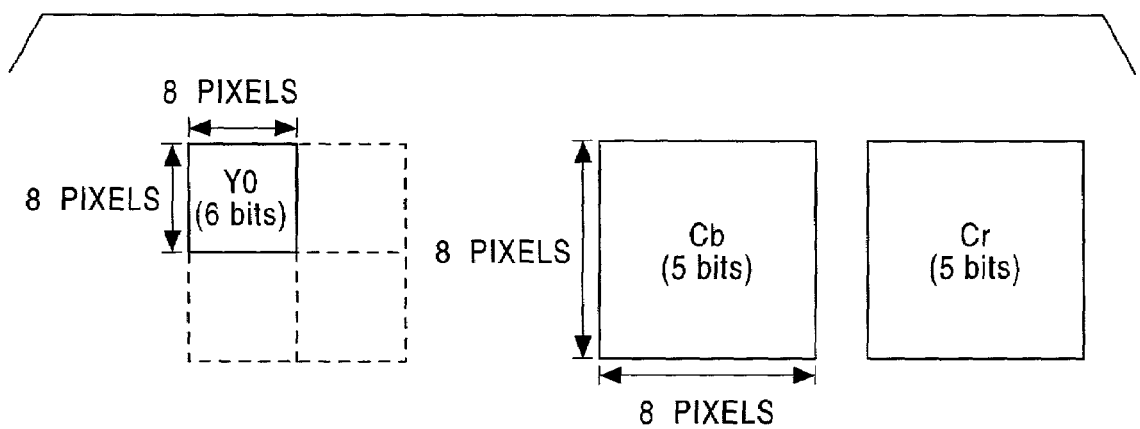
FIGS. 9A and 9B are diagrams illustrating macroblocks which are recorded on base data and helper data.
Figure 9B:
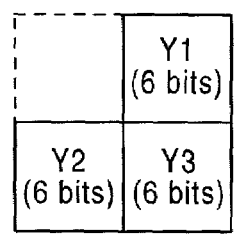

The base data, as shown in FIG. 9A, is formed of 3 macroblocks a macroblock such that DC components are extracted from the luminance signal Y0 of a DCT block of 8 pixels×8 pixels and are converted into 6 bits, and a macroblock such that DC components are extracted from each of the color-difference signals Cb and Cr of a DCT block of 8 pixels×8 pixels and are each converted into 5 bits. Also, the helper data, as shown in FIG. 9B, is formed of 3 macroblocks such that DC components are extracted from each of the luminance signals Y1 to Y3 of DCT blocks of 8 pixels ×8 pixels and are converted into 6 bits.

Then, the main image data output from the video data compression processing section 21, the search image data created by the search data creation section 62, the audio data output from the audio data compression processing section 24, and the input system data are, similar to the conventional case, output to the rotary head 29 via the switch 22, the error code ID addition section 25, the sync addition modulation section 26, the P/S conversion section 27, and the amplifier 28, and is recorded on the magnetic tape 30.

Figure 10:
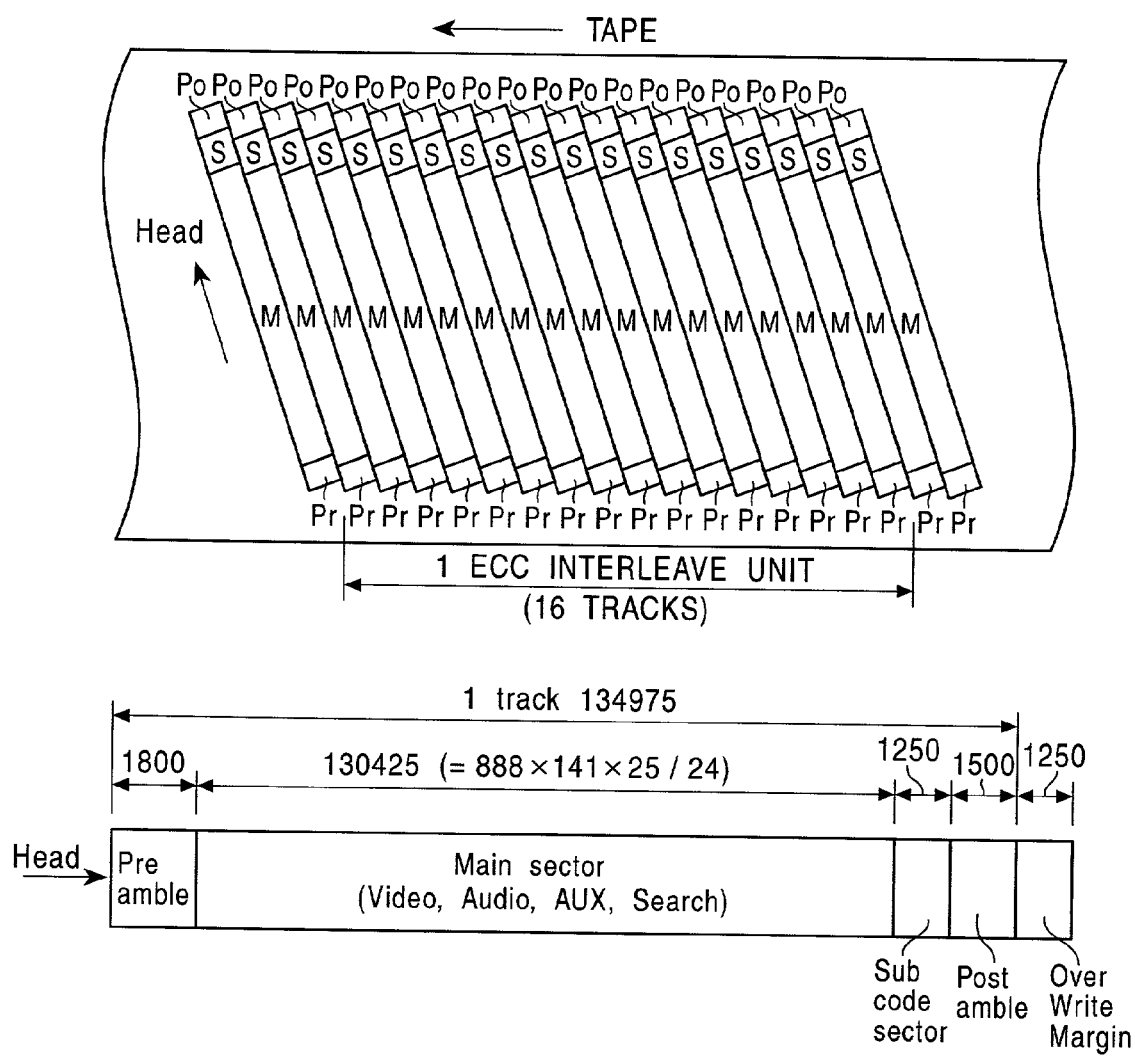
FIG. 10 is a diagram illustrating a track format of a magnetic tape.

FIG. 10 shows the track structure of data recorded on the magnetic tape by the rotary head 29. Each time the rotary head 29 traces once, a preamble (Pr), main data (M), a subcode sector (S), and a postamble (Po) are recorded. Then, one ECC (Error-Correcting Code) interleave unit is formed by 16 tracks, and error correction is performed in one ECC interleave unit. Therefore, tag recording and editing on the magnetic tape 30 are also performed in ECC interleave units.

Figure 11:
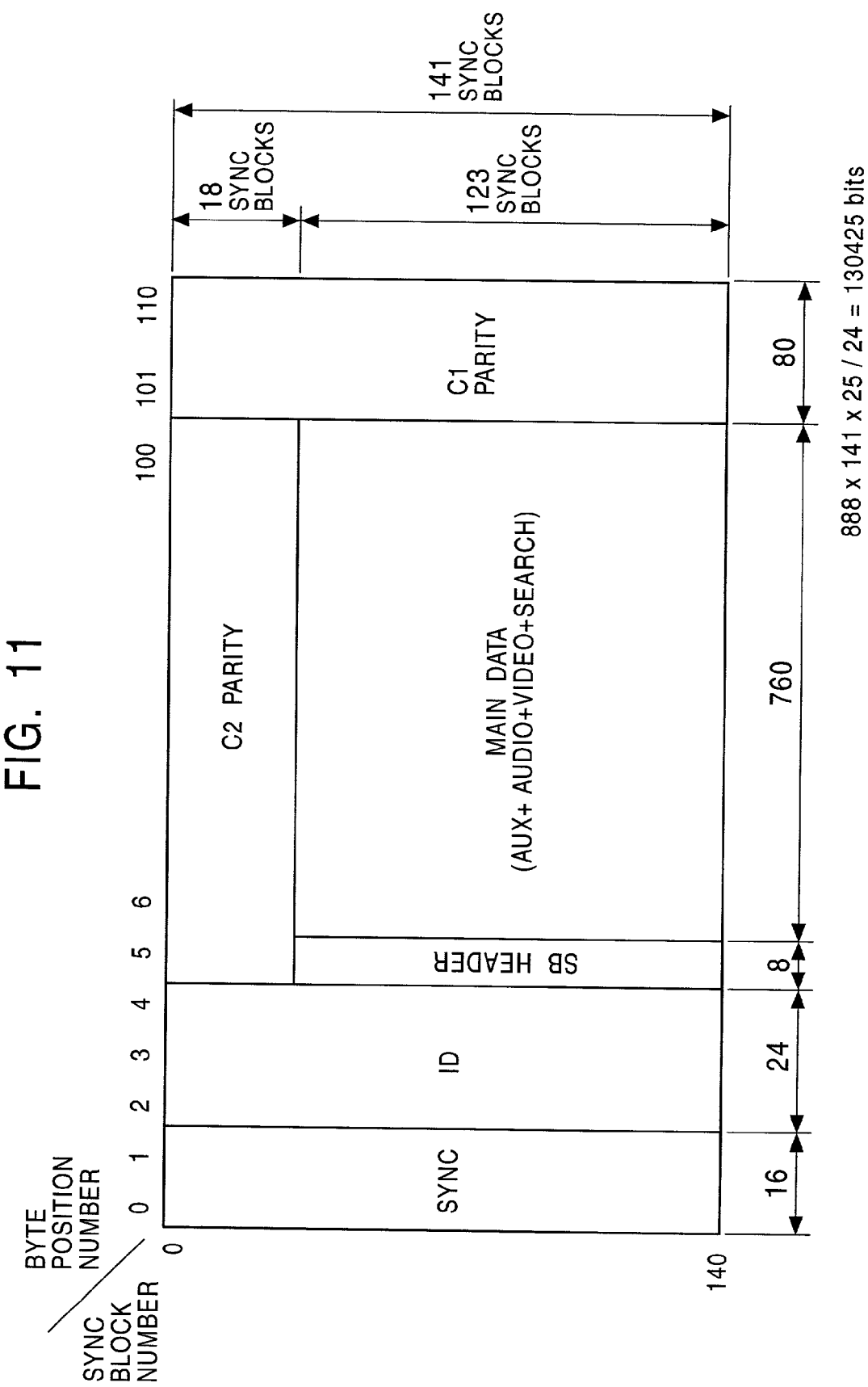
FIG. 11 is a diagram illustrating the structure of a main sector.

FIG. 11 shows the structure of a main sector.

In the error code ID addition section 25, for the 760-bit main data composed of AUX data, audio data, video data, or search data, an 8-bit sync block (SB) header indicating the contents of the data is added; redundancy information such as a C1 parity which is an error-correction code for dealing with an error during recording/reading, and a C2 parity which is an error-correction code for dealing with a burst error are added; and a 24-bit ID containing address information of the data, etc., is added. The C1 parity is also called an "inner parity", and the C2 parity is also called an "outer parity".

The macroblock described using FIG. 9A is recorded in the search data of the main sector corresponding to the base data, and the macroblock described using FIG. 9B is recorded in the search data of the main sector corresponding to the helper data. Then, the search image data composed of the base data or helper data is recorded on the search image data area similar to that of the case described using FIG. 4.

Figure 12:
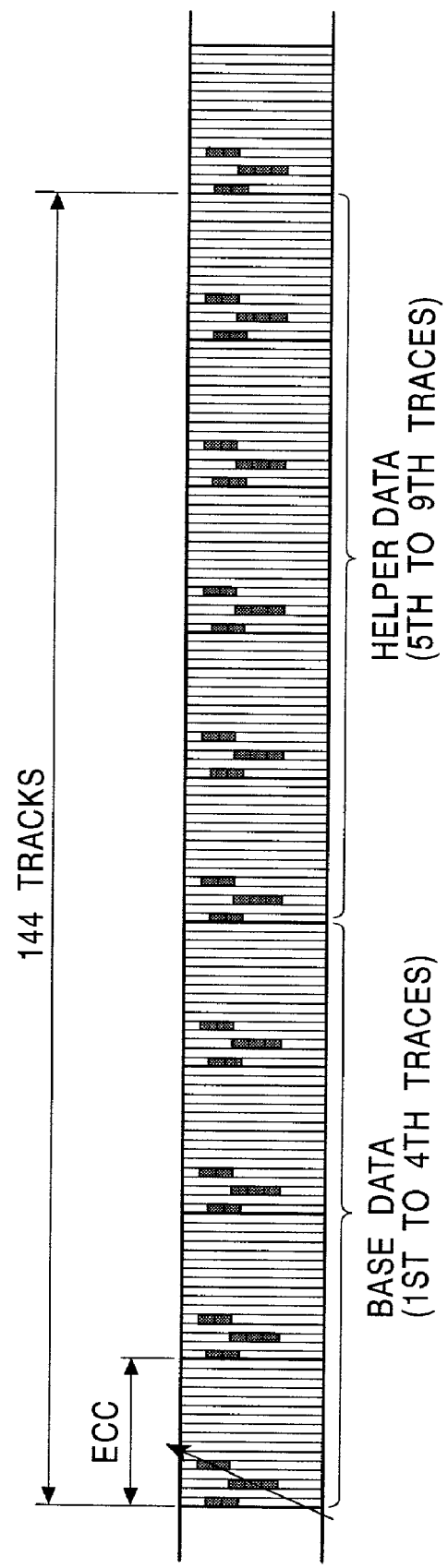
FIG. 12 is a diagram illustrating an example of the arrangement of a search image data area.

Then, as shown in FIG. 12, the search image data for 9 traces is arranged across 144 tracks in such a manner as to be separated into base data of 4 traces and helper data of 5 traces. Here, dummy data is inserted into the 10th trace as necessary so that, on average, one GOP (15 frames) is recorded on 150 tracks.

The data structure of the search sync block arranged on the tracks will now be described using FIG. 13.

A 96-byte sync block is composed of an 8-bit sync block common header, a 40-bit search sync block header, and 720-bit search image data. Since the search image data of the 1st to 4th traces is base data, macroblocks such that the DC components of the luminance signal Y0 are converted into 6 bits, and macroblocks such that the DC components of the color-difference signals Cb and Cr of a DCT block of 8 pixels×8 pixels are converted into 5-bit data described using FIG. 9A, in an amount corresponding to 45 macroblocks, are recorded. Also, since search image data of the 5th to 9th traces is helper data, macroblocks such that the DC components of each of the luminance signals Y0 to Y3 described using FIG. 9B are converted into 6 bits, in an amount corresponding to 40 macroblocks, are recorded.

Figure 4:
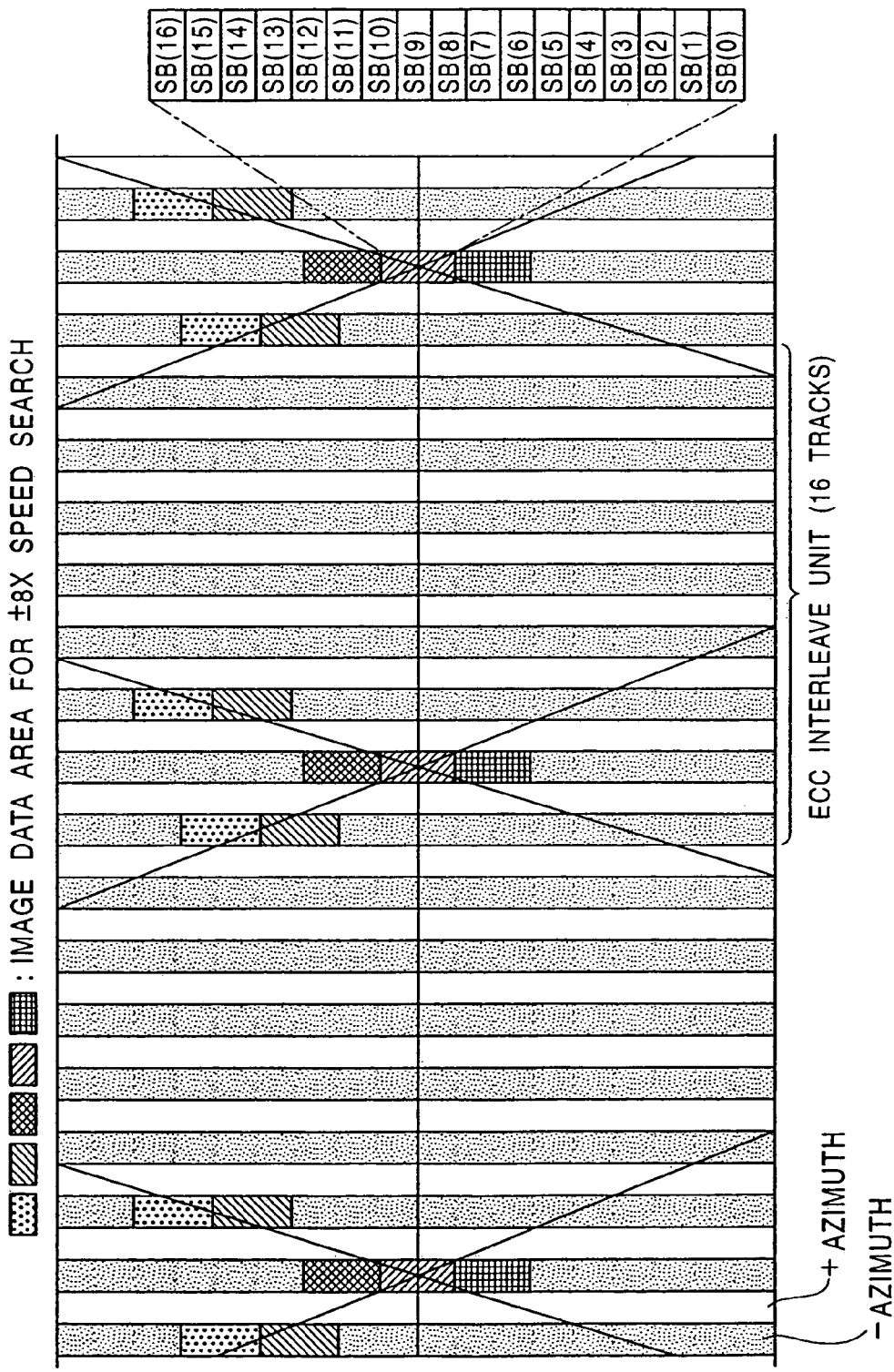
FIG. 4 is a diagram illustrating an example of the arrangement of a search image data area.
Figure 5:
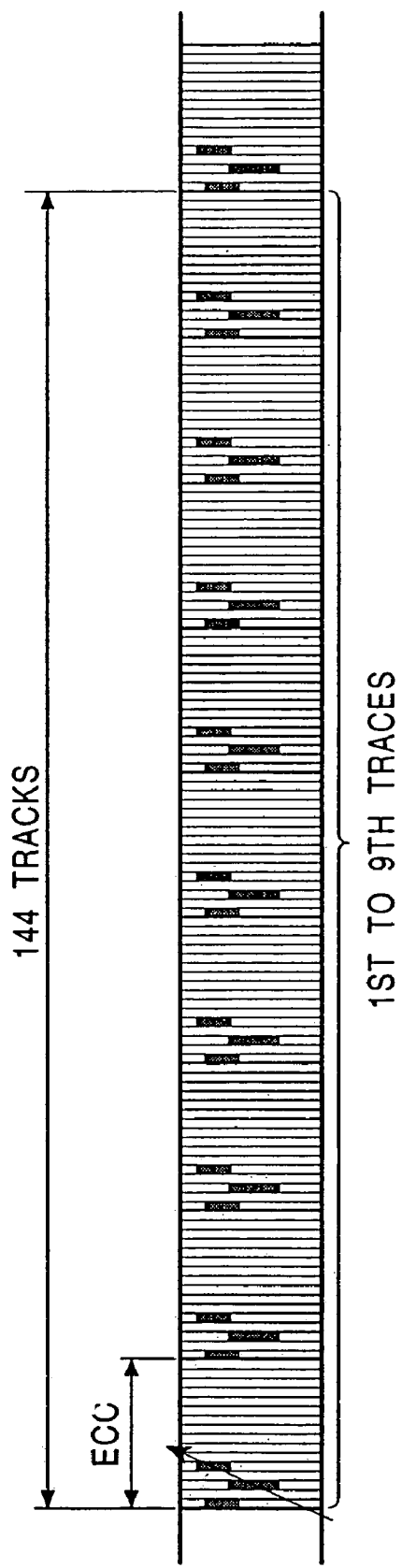
FIG. 5 is a diagram illustrating an example of the arrangement of a search image data area.
Figure 6:
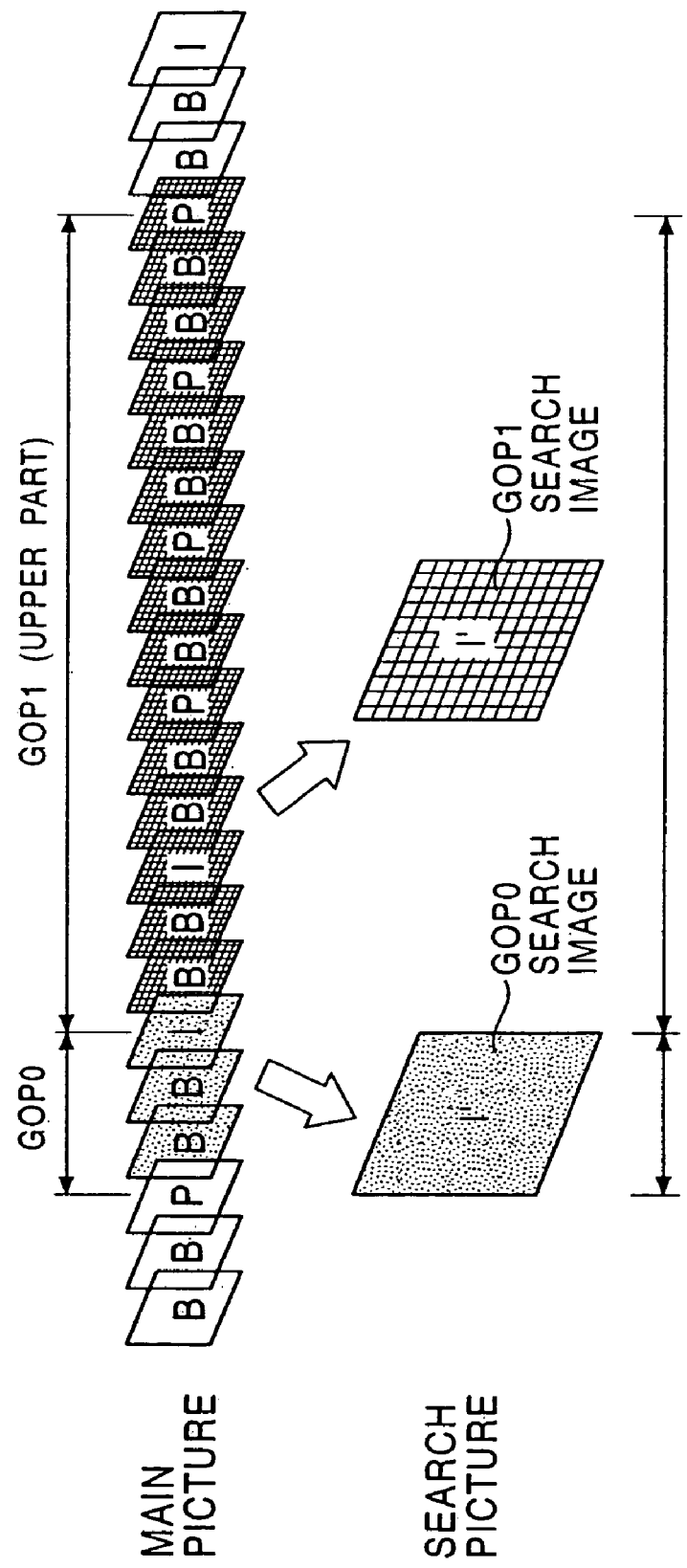
FIG. 6 is a diagram illustrating picture data in the vicinity of an editing point.
Figure 7:
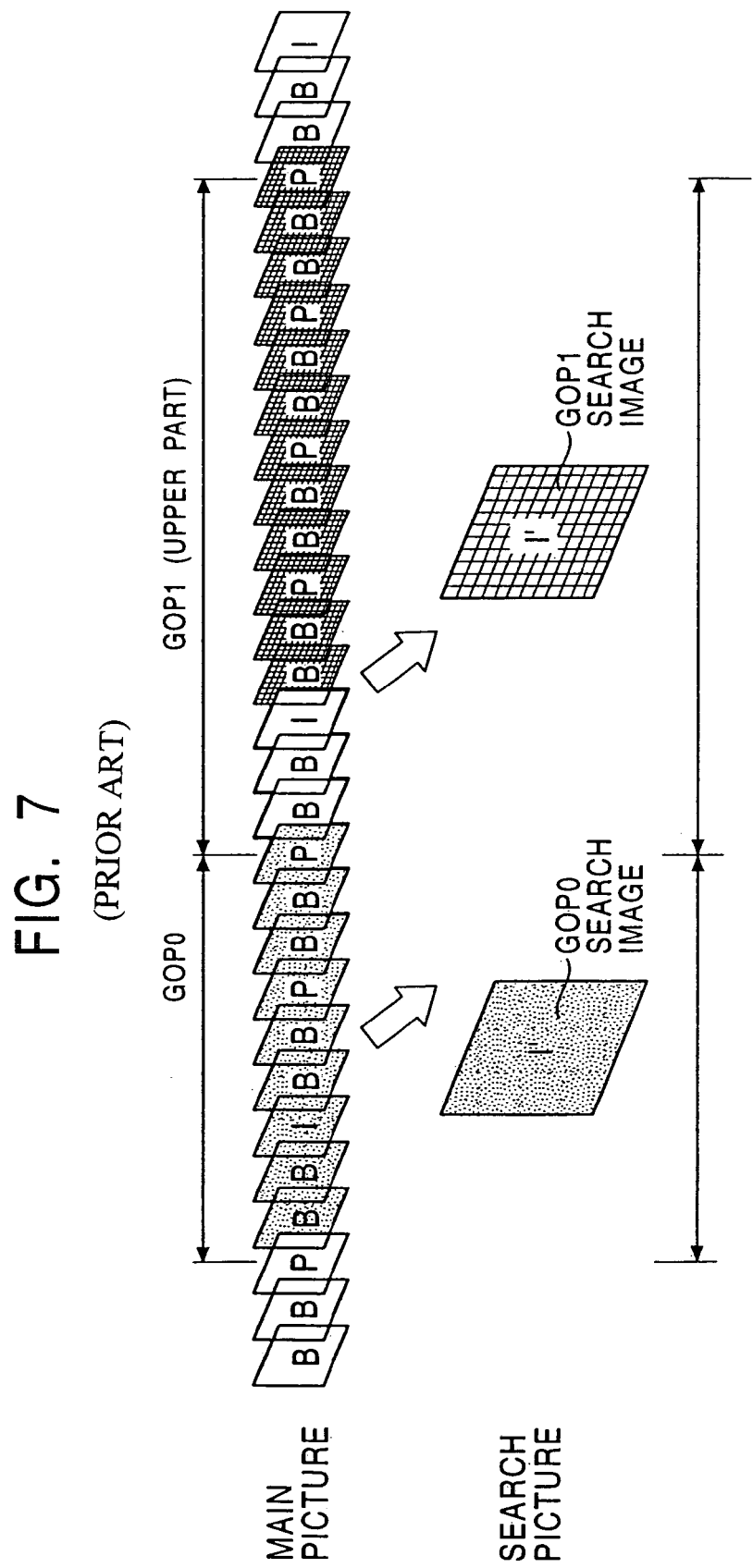
FIG. 7 is a diagram illustrating picture data in the vicinity of an editing point.

As described using FIG. 4, when a trace is performed once at an 8× speed, it is possible to obtain data of 34 sync blocks. Therefore, if search image data for 4 traces is obtained, it is possible to obtain data of 6120 macroblocks on the basis of 45 (macroblocks)×34 (sync blocks)×4 (traces), allowing data for one screen of a search image to be obtained. However, in this case, the luminance signal which can be obtained is only Y0.

Figure 13:
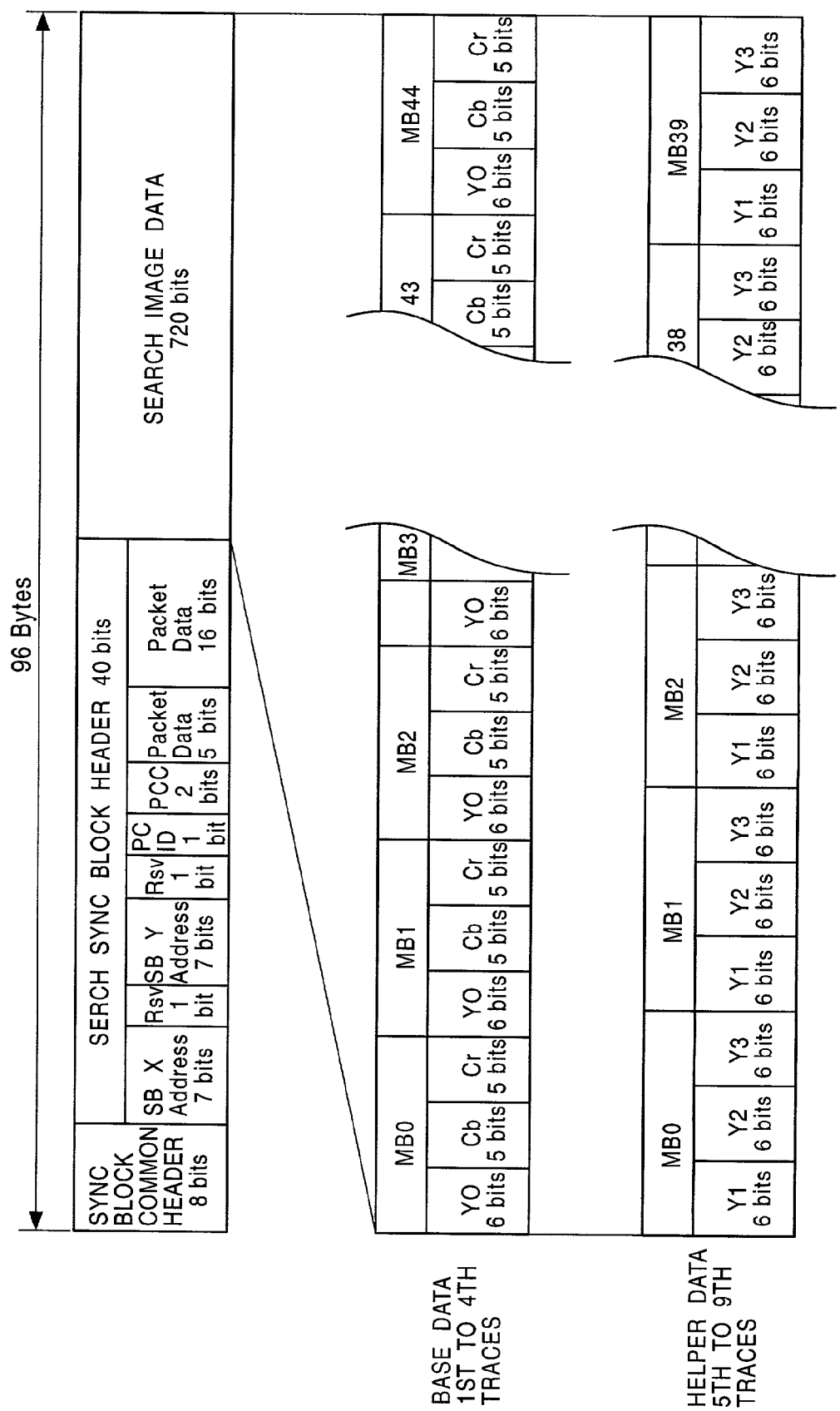
FIG. 13 is a diagram illustrating the structure of a search sync block.

The contents of the data recorded on the search sync block header of FIG. 13 are shown in FIG. 14. The leading 7 bits of the search sync block header is called the "SB X address" indicating the X coordinate of the start macroblock within the sync block. The next 7 bits, with 1-bit "reserved" in between, is called the "SB Y address" indicating the Y coordinate of the start macroblock within the sync block. The next bit, with a 1-bit "reserved" in between, is called the "picture class ID" indicating whether the search image data is base data or helper data. When the picture ID is "0", the search image data is base data, and when the picture ID is "1", the search image data is helper data.

The picture change counter information is 2-bit counter data for detecting whether or not data corresponding to this sync block is different search image data (search image data corresponding to overwritten image data). The packet header is 5-bit data indicating the contents of the following 16-bit packet data. The packet data is data containing various types of information for causing a search image to be displayed. The details of the packet data when the packet header indicates 0 to 31 are shown in FIG. 15.

When the packet header is "0", a search header (H) is written in the packet data, and when the packet header is "1", a search header (L) is written in the packet data.

FIG. 16 shows the details of the data written in the search headers (H) and (L). In the search header (H), various types of information for displaying a search image, such as P/I information indicating a progressive image or an interlaced image, aspect ratio information, and frame rate information, as well as native/TS information indicating a native (stream encoded by this apparatus) recording or a TS (Transport Stream) recording, a REC start flag indicating the recording starting point, and a CGMS (Copy Generate Management System) flag indicating information of the number of times in which copying can be made, are defined. In the search header (L), a horizontal size indicating the number of horizontal samples, and a vertical size indicating the number of vertical samples are defined.

When the packet header is "2" to "9", in the packet data, contents similar to the subcode data for a normal reproduction, such as a TTS (Title Time Code), REC TIME, REC DATA, ATN (Absolute Track Number) +FLG, are defined. These pieces of information make it possible to display the main image data for normal reproduction and search image data in such a manner as to be synchronized with each other.

Furthermore, when the packet header is "10" to "13", in the packet data, data for the magnetic tape 30 which has already been recorded, such as PART No. and CHAPTER START, is defined.

Figure 17:
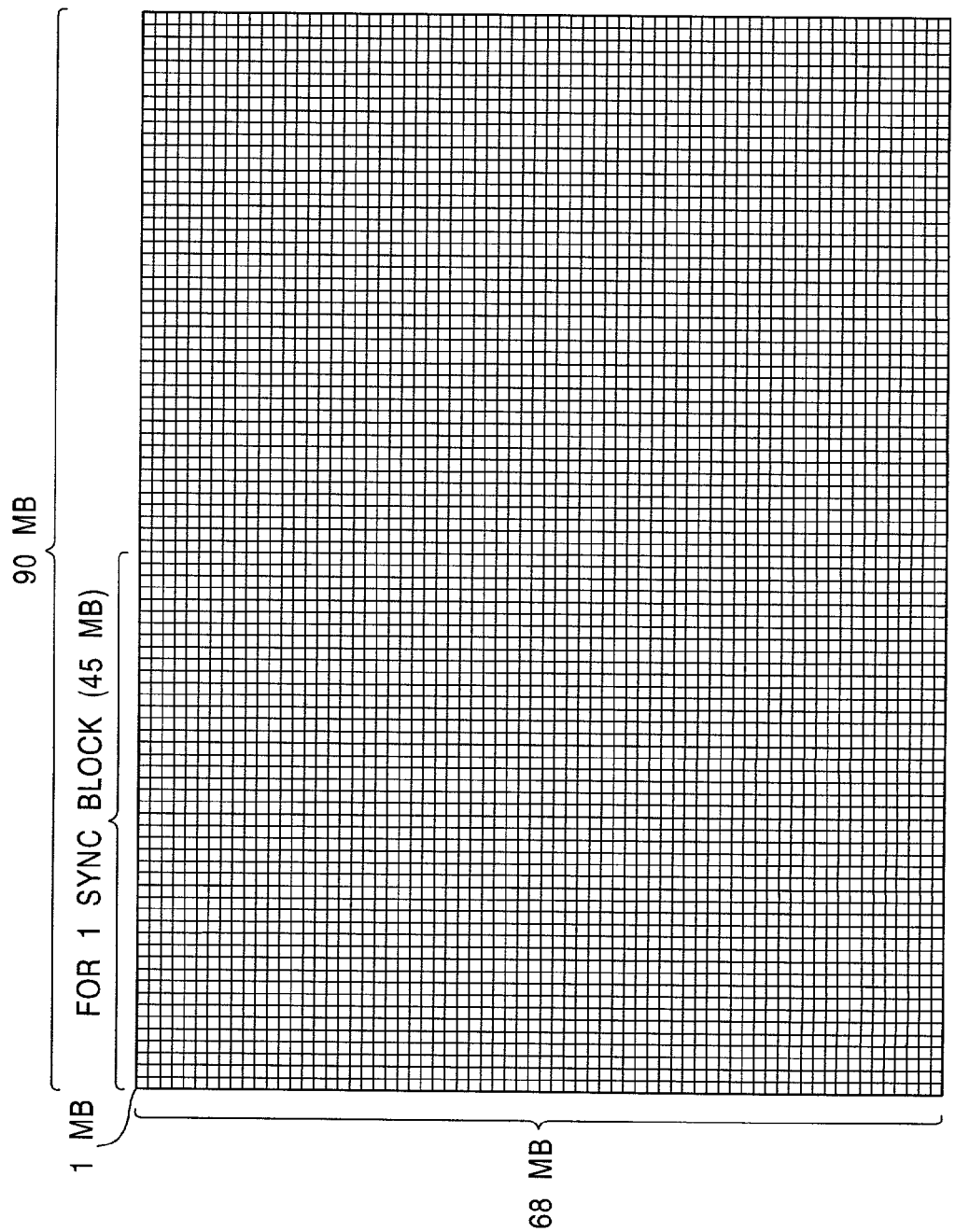
FIG. 17 is a diagram showing the correspondence between a macroblock and a display screen.

FIG. 17 shows the correspondence between a macroblock and a display screen. The display screen is composed of 68 vertical macroblocks and 90 horizontal macroblocks, similar to the case described using FIG. 3. As described using FIG. 13, since the base data contained in one sync block is 45 macroblocks, the base data of one sync block corresponds to a half of one line of the display screen. The search image display section 63 maps the macroblocks of the base data from left to right in the figure from the coordinates specified by the "SB X address" and the "SB Y address" of the search sync block header described using FIG. 14.

Figure 18:
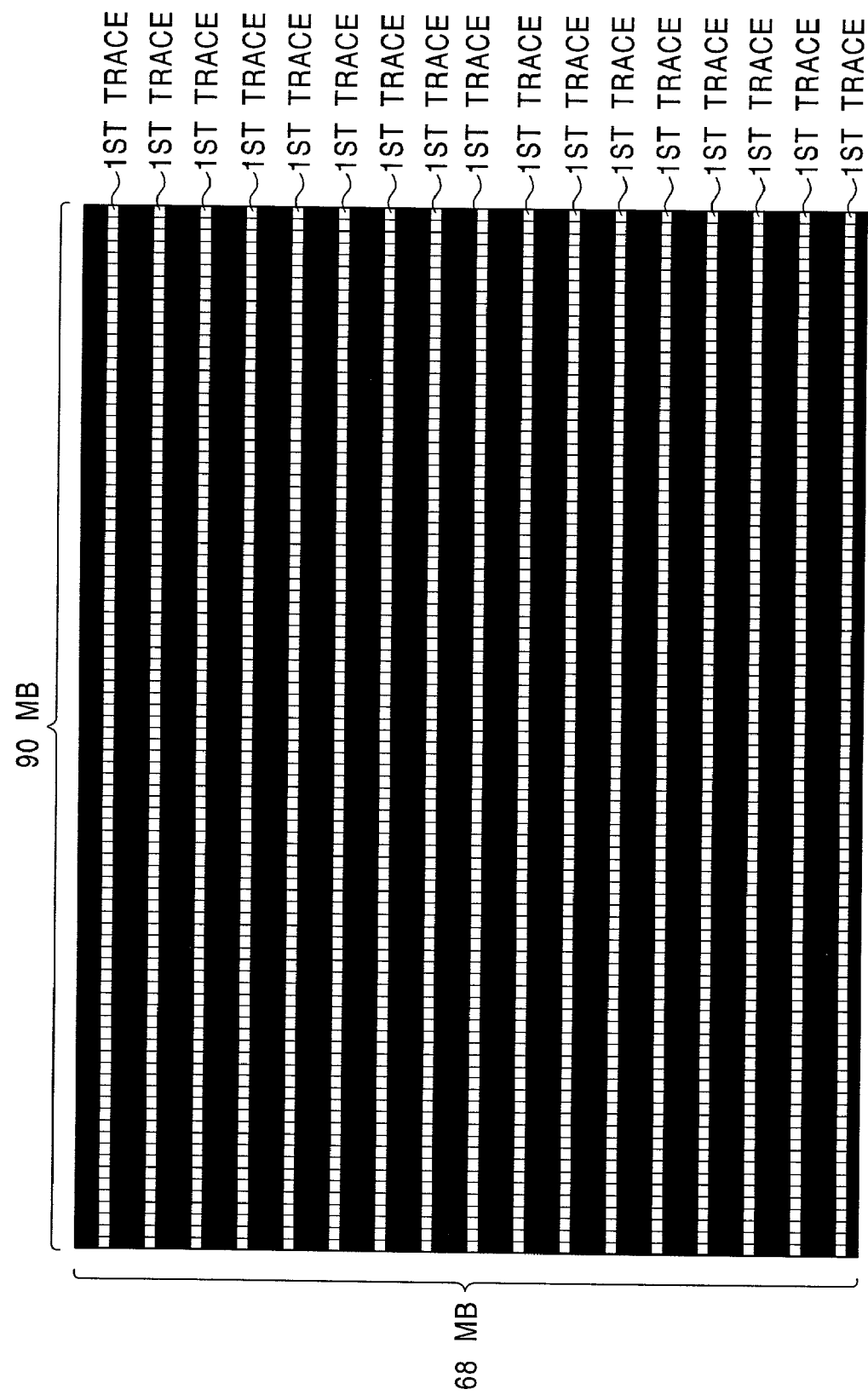
FIG. 18 is a diagram illustrating a display screen on which data obtained by a first trace is displayed.

In a case where only search image data for one trace remains due to editing, overwriting of new data, etc., as shown in FIG. 18, only the base data of the 1st trace (that is, data of 45 (macroblocks)×34 (sync blocks)) is displayed on, for example, the (4×n+3)-th line, where n=0, 1, 2, ..., 16. In this manner, by subdividing the search image data of the 1st trace, composed of the base data, over the entire screen, the contents of the entire screen can be roughly displayed by the information which can be obtained by one trace.

Figure 19:
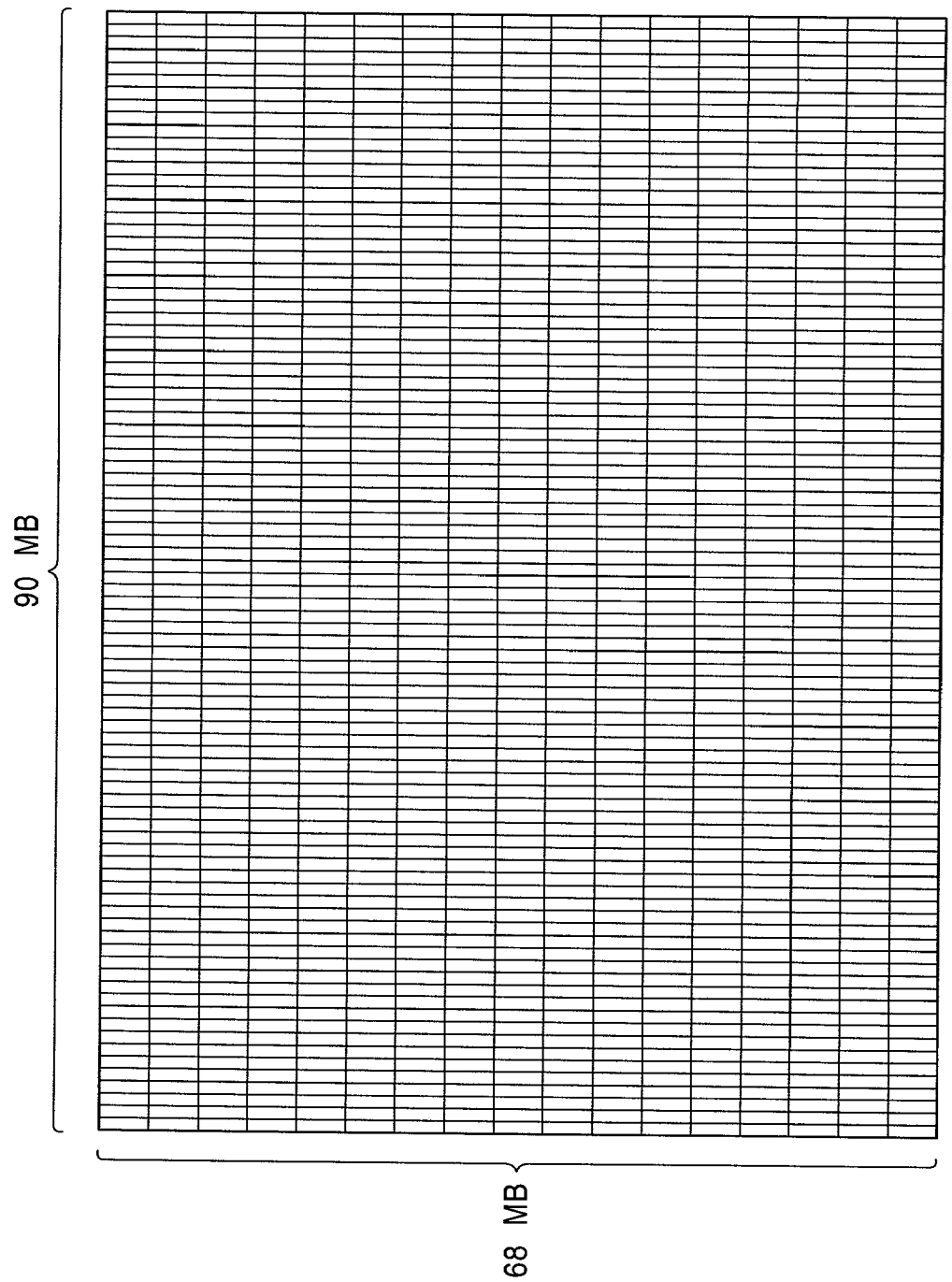
FIG. 19 is a diagram illustrating a display screen on which interpolation is performed based on the data of FIG. 18.

Furthermore, as shown in FIG. 19, the search image display section 63 is can display more easy-to-see image data by interpolating the base data obtained by the 1st trace, shown in FIG. 18, between the macroblocks, of which the data above and below the macroblocks have not been obtained.

Figure 20:
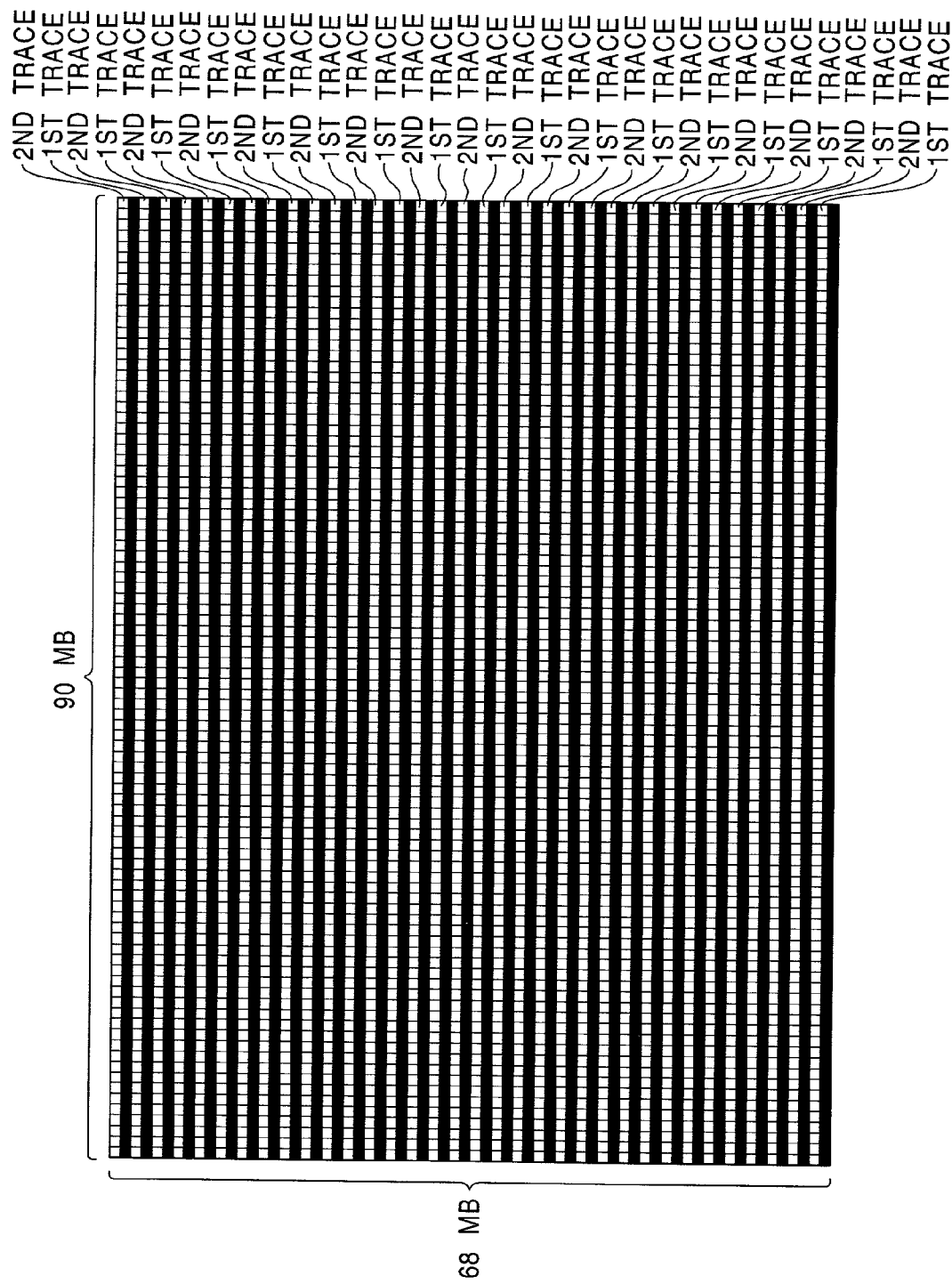
FIG. 20 is a diagram illustrating a display screen on which data obtained by a first trace and a second trace is displayed.
Figure 21:
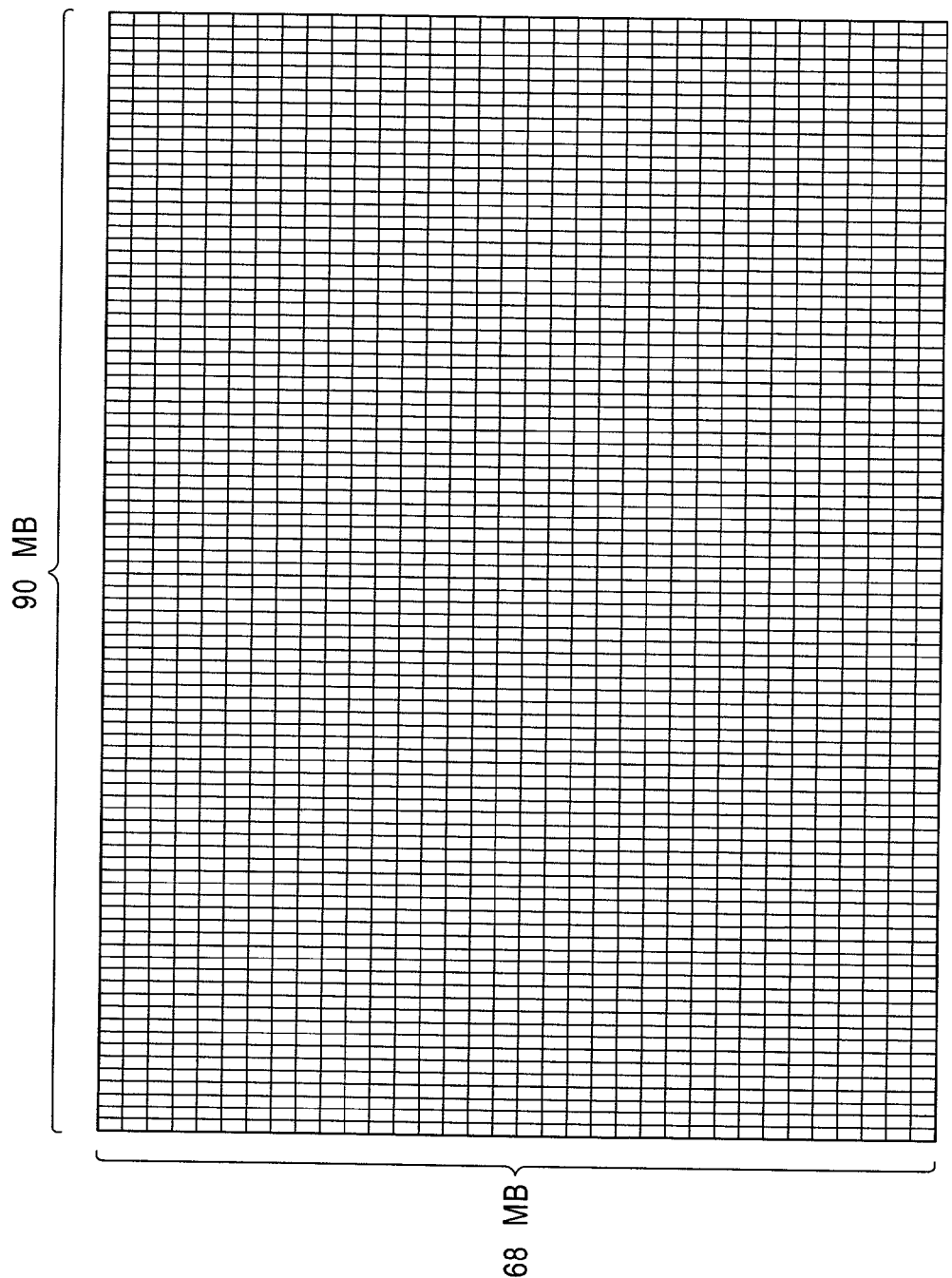
FIG. 21 is a diagram illustrating a display screen on which interpolation is performed based on the data of FIG. 20.

In a case where, for example, only the search image data of the 1st and 2nd traces remain due to editing, overwriting of new data, etc., as shown in FIG. 20, if the base data of the 1st trace is displayed on the (4×n+3)th line, where n=0, 1, 2, ..., 16, and the base data of the 2nd trace is displayed on the (4×n+1)-th line, where n=0, 1, 2, ..., 16, all of the image data which is more easy to see than in the case shown in FIG. 18 is displayed. Also in this case, similarly, by interpolating the base data of the 1st and 2nd traces between the macroblock, of which the data above and below it has not been obtained, by the search image display section 63 can obtain a display screen such as that shown in FIG. 21.

Then, as the number of traces increases, it becomes possible to display image data closer to perfect image data. For example, when search image data up to the 4th trace can be obtained, since all the base data can be obtained, it is possible to obtain the luminance signal Y0, and the color-difference signals Cb and Cr corresponding to all the macroblocks. However, in this state, since the luminance signals Y1 to Y3 have not been obtained, perfect image data is not displayed.

As a result of obtaining the helper data of the 5th to 9th traces, the luminance information within each macroblock is increased, and the image quality of the image to be displayed is improved. Also for this helper data, the macroblocks of the helper data are mapped from left to right in the figure from the coordinates specified by the "SB X address" and the "SB Y address" of the search sync block header described using FIG. 14.

Figure 22:
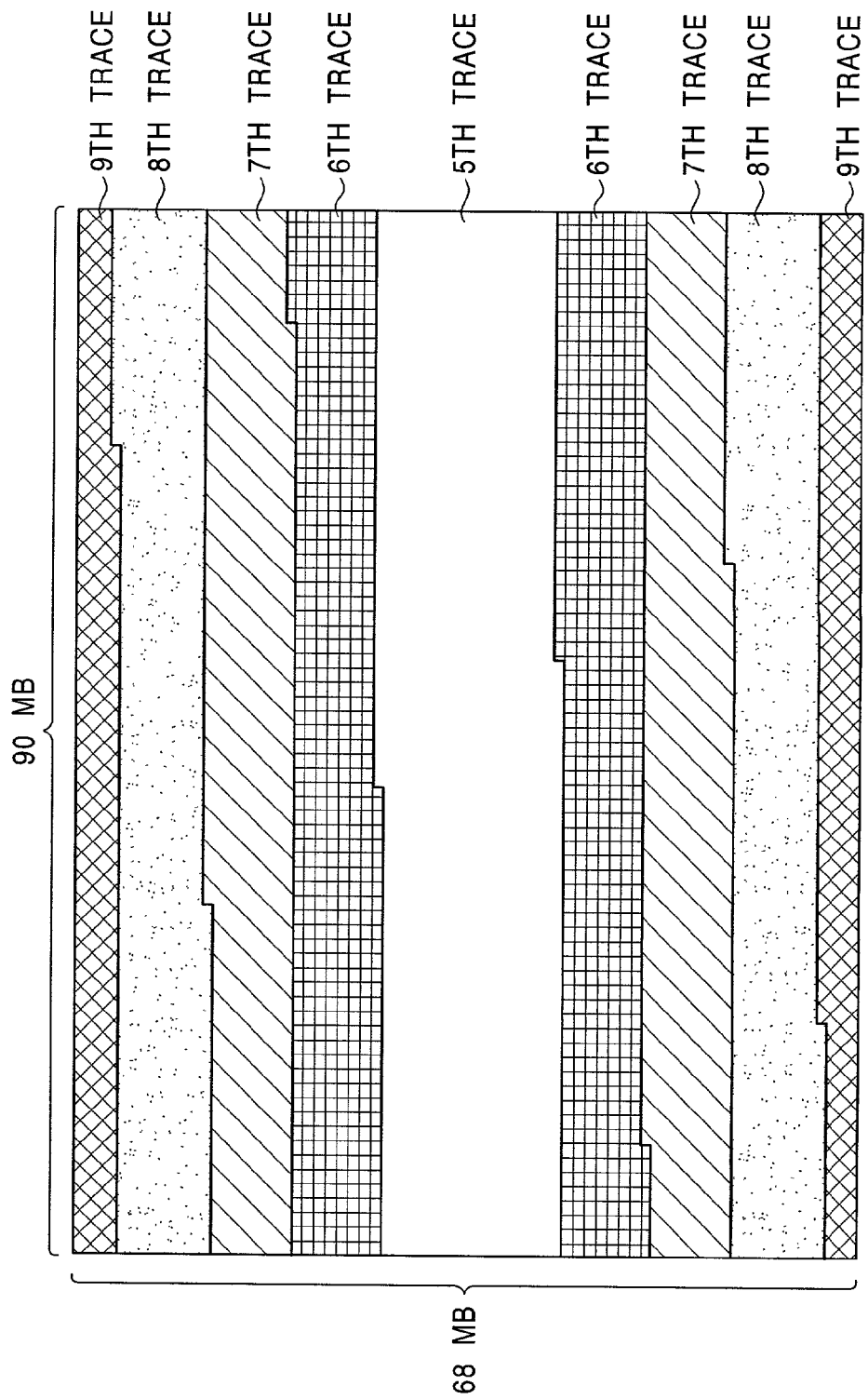
FIG. 22 is a diagram showing the correspondence between helper data and a display screen.

The possibility that the search image data is erased due to editing or overwriting is higher for the data recorded in the parts towards the end (that is, data having a larger number). For example, as shown in FIG. 22, by making the luminance signals Y1 to Y3 of the macroblock corresponding to the center of the display screen correspond in sequence from the 5th trace, it is possible to prevent the search image data in which some of the data is lost from appearing unnatural when viewed by a user.

Here, although a case is described in which some of the search image data is erased due to tag recording, for example, during a pull-in of tracking control for tracing search data and also when search image data does not become available for one screen as a result of an error occurring during reading, by applying the present invention, it is possible to prevent, by using the obtained search image data when some of the data is lost, a screen from appearing unnatural when viewed by a user.

Also when the structure of the main image data and the search image data has a different data size from the case described here or of an image format of another type, it is possible to apply the present invention.

Although the above-described series of processes can also be performed by software. For the software, programs which form the software are installed from a recording medium into a computer incorporated into dedicated hardware or, for example, into a general-purpose personal computer capable of executing various types of functions by installing various programs.

This recording medium, as shown in FIG. 8, is constructed by packaged media formed of a magnetic disk 71 (including a floppy disk), an optical disk 72 (including a CD-ROM (Compact Disk-Read Only Memory), and a DVD (Digital Versatile Disk)); a magneto-optical disk 73 (including an MD (Mini-Disk)); or a semiconductor memory 74, in which programs are recorded, and is distributed separately from the computer so as to distribute programs to users.

In this specification, steps which describe a program recorded on a recording medium contain not only processes performed in a time-series manner along the described sequence, but also processes performed in parallel or individually although the processes are not necessarily performed in a time-series manner.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information recording apparatus for recording information on a predetermined recording medium, said information recording apparatus comprising:
   creation means for creating search data from main image data; and
   recording means for recording said search data created by said creation means and said main image data on said recording medium,
   wherein said creation means creates first data by which an image can be displayed over an entire screen, and second data for enhancing the image quality of said image displayed by said first data, each being used as said search data, and said recording means records said first data sequentially followed on the recording medium by said second data,
   wherein the first data includes a first macro block of discrete cosine components extracted from a first luminance signal, a second macro block of discrete cosine components extracted from a first color-difference signal, and a third macro block of discrete cosine components extracted from a second color-difference signal, and
   wherein the second data includes three macro blocks of discrete cosine components extracted from each of three luminance signals, the three luminance signals and the first luminance signal are portions of a main luminance signal.

2. An information recording apparatus according to claim 1, wherein said recording means records said second data after said first data is recorded.

3. An information recording apparatus according to claim 1, wherein said creation means creates each of said first data and said second data in such a manner so as to be divided into a plurality of portions in predetermined units.

4. An information recording apparatus according to claim 3, wherein said predetermined units are units of blocks in which error checking is performed.

5. An information recording apparatus according to claim 3, wherein said creation means creates said second data corresponding to the central portion of one screen of said image, and at least one piece of said second data corresponding to a portion which is outside the central portion, and said recording means records a plurality of pieces of said second data in a sequence from the data corresponding to the central portion of one screen of said image to the data corresponding to a portion outside the central portion.

6. An information recording apparatus according to claim 3, wherein said recording means records said first data in said predetermined units in such a manner as to be obtained by one trace during reading.

7. An information recording apparatus according to claim 1, wherein said search data is composed of image data and control data, said control data has a packet structure in which a search header and subcode data which is the same as said main image data are written in such a manner so as to be divided, and the packet header of said packet structure indicates which data is written in said control data.

8. An information recording method for use with an information recording apparatus for recording information on a predetermined recording medium, said information recording method comprising:
   a creation step for creating search data from main image data; and
   a recording step for recording said search data created in said creation step and said main image data on said recording medium,
   wherein, in said creation step, first data by which an image can be displayed over an entire screen and second data for enhancing the image quality of said image displayed by said first data, each being used as said search data, are created, and in said recording step, said first data sequentially followed on the recording medium by said second data are recorded,
   wherein the first data includes a first macro block of discrete cosine components extracted from a first luminance signal, a second macro block of discrete cosine components extracted from a first color-difference signal, and a macro block of discrete cosine components extracted from a second color-difference signal, and
   wherein the second data includes three macro blocks of discrete cosine components extracted from each of three luminance signals, the three luminance signals and the first luminance signal are portions of a main luminance signal.

9. A recording medium having recorded thereon a computer-readable program for use with an information recording apparatus for reading information on a predetermined recording medium, said program comprising:
   a creation step for creating search data from main image data; and
   a recording step for recording said search data created in said creation step and said main image data on said recording medium,
   wherein, in said creation step, first data by which an image can be displayed over an entire screen and second data for enhancing the image quality of said image displayed by said first data, each being used as said search data, are created, and in said recording step, said first data sequentially followed on the recording medium by said second data are recorded,
   wherein the first data includes a first macro block of discrete cosine components extracted from a first luminance signal, a second macro block of discrete cosine components extracted from a first color-difference signal, and a macro block of discrete cosine components extracted from a second color-difference signal, and wherein the second data includes three macro blocks of discrete cosine components extracted from each of three luminance signals, the three luminance signals and the first luminance signal are portions of a main luminance signal.

10. An information reading apparatus for reading information recorded on a predetermined recording medium, said information reading apparatus comprising:

acquiring means for acquiring search data, which is composed of image data and control data, recorded on said recording medium; and display control means for controlling the display position of said image data on the basis of coordinate information contained in said control data, wherein the image data comprises:

first data having three macro blocks including a first macro block of discrete cosine components extracted from a first luminance signal, a second macro block of discrete cosine components extracted from a first color-difference signal, and a third macro block of discrete cosine components extracted from a second color-difference signal, and second data, recorded sequentially after the first data, having three macro blocks of discrete cosine components extracted from each of three luminance signals, the three luminance signals and the first luminance signals are portions of a main luminance signal.

11. An information reading apparatus according to claim 10, further comprising interpolation means for interpolating a display image by using said search data obtained by said acquiring means when said search data obtained by said acquiring means is less than the required amount of data for one screen of the display image.

12. An information reading method for use with an information reading apparatus for reading information recorded on a predetermined recording medium, said information reading method comprising:

an acquiring step for acquiring search data, which is composed of image data and control data, recorded on said recording medium; and a display control step for controlling a display position of said image data on the basis of coordinate information contained in said control data, wherein the image data comprises:

first data having three macro blocks including a first macro block of discrete cosine components extracted from a first luminance signal, a second macro block of discrete cosine components extracted from a first color-difference signal, and a third macro block of discrete cosine components extracted from a second color-difference signal, and second data, recorded sequentially after the first data, having three macro blocks of discrete cosine components extracted from each of three luminance signals, the three luminance signals and the first luminance signals are portions of a main luminance signal.

13. A recording medium having recorded thereon a computer-readable program for use in an information reading apparatus for reading information recorded on a predetermined recording medium, said program comprising:

an acquiring step for acquiring search data, which is composed of image data and control data, recorded on said recording medium; and a display control step for controlling a display position of said image data on the basis of coordinate information contained in said control data, wherein the image data comprises:

first data having three macro blocks including a first macro block of discrete cosine components extracted from a first luminance signal, a second macro block of discrete cosine components extracted from a first color-difference signal, and a third macro block of discrete cosine components extracted from a second color-difference signal, and second data, recorded sequentially after the first data, having three macro blocks of discrete cosine components extracted from each of three luminance signals, the three luminance signals and the first luminance signals are portions of a main luminance signal.

14. An information recording apparatus for recording information on a predetermined recording medium, said information recording apparatus comprising:

creation means for creating search data from main image data; and recording means for recording said search data created by said creation means and said main image data on said recording medium, wherein said creation means creates first data by which an image can be displayed over an entire screen, and second data for enhancing the image quality of said image displayed by said first data, each being used as said search data, and said recording means records said first data sequentially followed on the recording medium by said second data, wherein the search data for nine traces of the recording medium are arranged across 144 tracks separated into four traces of first data sequentially followed on the recording medium by five traces of second data, wherein the first data includes a first macro block of discrete cosine components are extracted from a first luminance signal, a second macro block of discrete cosine components are extracted from a first color-difference signal, and a third macro block of discrete cosine components are extracted from a second color-difference signal, and wherein the second data includes three macro blocks of discrete cosine components extracted from each of three luminance signals, wherein the three luminance signals and the first luminance signal are portions of a main luminance signal.

15. An information recording apparatus according to claim 14, wherein said recording means records said second data after said first data is recorded.

16. An information recording apparatus according to claim 14, wherein said creation means creates each of said first data and said second data in such a manner so as to be divided into a plurality of portions in predetermined units.

17. An information recording apparatus according to claim 16, wherein said predetermined units are units of blocks in which error checking is performed.

18. An information recording apparatus according to claim 16, wherein said creation means creates said second data corresponding to the central portion of one screen of said image, and at least one piece of said second data corresponding to a portion which is outside the central portion, and said recording means records a plurality of pieces of said second data in a sequence from the data corresponding to the central portion of one screen of said image to the data corresponding to a portion outside the central portion.

19. An information recording apparatus according to claim 16, wherein said recording means records said first data in said predetermined units in such a manner as to be obtained by one trace during reading.

20. An information recording apparatus according to claim 14, wherein said search data is composed of image data and control data, said control data has a packet structure in which a search header and subcode data which is the same as said main image data are written in such a manner so as to be divided, and the packet header of said packet structure indicates which data is written in said control data.

21. An information recording method for use with an information recording apparatus for recording information on a predetermined recording medium, said information recording method comprising:
  a creation step for creating search data from main image data; and
  a recording step for recording said search data created in said creation step and said main image data on said recording medium,
  wherein, in said creation step, first data by which an image can be displayed over an entire screen and second data for enhancing the image quality of said image displayed by said first data, each being used as said search data, are created, and in said recording step, said first data sequentially followed on the recording medium by said second data,
  wherein the search data for nine traces of the recording medium are arranged across 144 tracks separated into four traces of first data sequentially followed on the recording medium by five traces of second data,
  wherein the first data includes a first macro block of discrete cosine components are extracted from a first luminance signal, a second macro block of discrete cosine components are extracted from a first color-difference signal, and a third macro block of discrete cosine components are extracted from a second color-difference signal, and
  wherein the second data includes three macro blocks of discrete cosine components extracted from each of three luminance signals, wherein the three luminance signals and the first luminance signal are portions of a main luminance signal.

22. A recording medium having recorded thereon a computer-readable program for use with an information recording apparatus for reading information on a predetermined recording medium, said program comprising:
  a creation step for creating search data from main image data; and
  a recording step for recording said search data created in said creation step and said main image data on said recording medium,
  wherein, in said creation step, first data by which an image can be displayed over an entire screen and second data for enhancing the image quality of said image displayed by said first data, each being used as said search data, are created, and in said recording step, said first data sequentially followed on the recording medium by said second data,
  wherein the search data for nine traces of the recording medium are arranged across 144 tracks separated into four traces of first data sequentially followed on the recording medium by five traces of second data,
  wherein the first data includes a first macro block of discrete cosine components are extracted from a first luminance signal, a second macro block of discrete cosine components are extracted from a first color-difference signal, and a third macro block of discrete cosine components are extracted from a second color-difference signal, and
  wherein the second data includes three macro blocks of discrete cosine components extracted from each of three luminance signals, wherein the three luminance signals and the first luminance signal are portions of a main luminance signal.

23. An information reading apparatus for reading information recorded on a predetermined recording medium, said information reading apparatus comprising:
  acquiring means for acquiring search data, which is composed of image data and control data, recorded on said recording medium; and
  display control means for controlling the display position of said image data on the basis of coordinate information contained in said control data,
  wherein the image data for nine traces of the recording medium are arranged across 144 tracks separated into four traces of first data sequentially followed on the recording medium by five traces of second data,
  wherein the first data includes a first macro block of discrete cosine components are extracted from a first luminance signal, a second macro block of discrete cosine components are extracted from a first color-difference signal, and a third macro block of discrete cosine components are extracted from a second color-difference signal, and
  wherein the second data includes three macro blocks of discrete cosine components extracted from each of three luminance signals, wherein the three luminance signals and the first luminance signal are portions of a main luminance signal.

24. An information reading apparatus according to claim 23, further comprising interpolation means for interpolating a display image by using said search data obtained by said acquiring means when said search data obtained by said acquiring means is less than the required amount of data for one screen of the display image.

25. An information reading method for use with an information reading apparatus for reading information recorded on a predetermined recording medium, said information reading method comprising:
  an acquiring step for acquiring search data, which is composed of image data and control data, recorded on said recording medium; and
  a display control step for controlling a display position of said image data on the basis of coordinate information contained in said control data,
  wherein the image data for nine traces of the recording medium are arranged across 144 tracks separated into four traces of first data sequentially followed on the recording medium by five traces of second data,
  wherein the first data includes a first macro block of discrete cosine components are extracted from a first luminance signal, a second macro block of discrete cosine components are extracted from a first color-difference signal, and a third macro block of discrete cosine components are extracted from a second color-difference signal, and
  wherein the second data includes three macro blocks of discrete cosine components extracted from each of three luminance signals, wherein the three luminance signals and the first luminance signal are portions of a main luminance signal.

26. A recording medium having recorded thereon a computer-readable program for use in an information reading apparatus for reading information recorded on a predetermined recording medium, said program comprising:

an acquiring step for acquiring search data, which is composed of image data and control data, recorded on said recording medium; and a display control step for controlling a display position of said image data on the basis of coordinate information contained in said control data, wherein the image data for nine traces of the recording medium are arranged across 144 tracks separated into four traces of first data sequentially followed on the recording medium by five traces of second data, wherein the first data includes a first macro block of discrete cosine components are extracted from a first luminance signal, a second macro block of discrete cosine components are extracted from a first color-difference signal, and a third macro block of discrete cosine components are extracted from a second color-difference signal, and wherein the second data includes three macro blocks of discrete cosine components extracted from each of three luminance signals, wherein the three luminance signals and the first luminance signal are portions of a main luminance signal.

27. An information recording apparatus for recording information on a predetermined recording medium, said information recording apparatus comprising:

creation means for creating search data from main image data; and recording means for recording said search data created by said creation means and said main image data on said recording medium, wherein said creation means creates first data by which an image can be displayed over an entire screen, and second data for enhancing the image quality of said image displayed by said first data, each being used as said search data, and said recording means records said first data sequentially followed on the recording medium by said second data, wherein the first data includes a first macro block of discrete cosine components extracted from a first luminance signal, a second macro block of discrete cosine components extracted from a first color-difference signal, and a third macro block of discrete cosine components extracted from a second color-difference signal, and wherein the second data includes three macro blocks of discrete cosine components extracted from each of three luminance signals, wherein the three luminance signals and the first luminance signal are portions of a main luminance signal, wherein a sync block of a sync block header of the recording medium includes macro blocks that correspond with the image displayed such that macro blocks of the first data are mapped to the display image, left to right, from an X address of a start macro block and a Y address of the start macro block, and wherein the sync block header includes a picture class ID to indicate whether the search data is first data or second data.

28. An information recording apparatus according to claim 27, wherein said recording means records said second data after said first data is recorded.

29. An information recording apparatus according to claim 27, wherein said creation means creates each of said first data and said second data in such a manner so as to be divided into a plurality of portions in predetermined units.

30. An information recording apparatus according to claim 29, wherein said predetermined units are units of blocks in which error checking is performed.

31. An information recording apparatus according to claim 29, wherein said creation means creates said second data corresponding to the central portion of one screen of said image, and at least one piece of said second data corresponding to a portion which is outside the central portion, and said recording means records a plurality of pieces of said second data in a sequence from the data corresponding to the central portion of one screen of said image to the data corresponding to a portion outside the central portion.

32. An information recording apparatus according to claim 29, wherein said recording means records said first data in said predetermined units in such a manner as to be obtained by one trace during reading.

33. An information recording apparatus according to claim 27, wherein said search data is composed of image data and control data, said control data has a packet structure in which a search header and subcode data which is the same as said main image data are written in such a manner so as to be divided, and the packet header of said packet structure indicates which data is written in said control data.

34. An information recording method for use with an information recording apparatus for recording information on a predetermined recording medium, said information recording method comprising:

a creation step for creating search data from main image data; and a recording step for recording said search data created in said creation step and said main image data on said recording medium, wherein, in said creation step, first data by which an image can be displayed over an entire screen and second data for enhancing the image quality of said image displayed by said first data, each being used as said search data, are created, and in said recording step, said first data sequentially followed on the recording medium by said second data, wherein the first data includes a first macro block of discrete cosine components extracted from a first luminance signal, a second macro block of discrete cosine components extracted from a first color-difference signal, and a third macro block of discrete cosine components extracted from a second color-difference signal, and wherein the second data includes three macro blocks of discrete cosine components extracted from each of three luminance signals, wherein the three luminance signals and the first luminance signal are portions of a main luminance signal, wherein a sync block of a sync block header of the recording medium includes macro blocks that correspond with the image displayed such that macro blocks of the first data are mapped to the display image, left to right, from an X address of a start macro block and a Y address of the start macro block, and wherein the sync block header includes a picture class ID to indicate whether the search data is first data or second data.

35. A recording medium having recorded thereon a computer-readable program for use with an information recording apparatus for reading information on a predetermined recording medium, said program comprising:

a creation step for creating search data from main image data; and a recording step for recording said search data created in said creation step and said main image data on said recording medium, wherein, in said creation step, first data by which an image can be displayed over an entire screen and second data for enhancing the image quality of said image displayed by said first data, each being used as said search data, are created, and in said recording step, said first data sequentially followed on the recording medium by said second data, wherein the first data includes a first macro block of discrete cosine components extracted from a first luminance signal, a second macro block of discrete cosine components extracted from a first color-difference signal, and a third macro block of discrete cosine components extracted from a second color-difference signal, and wherein the second data includes three macro blocks of discrete cosine components extracted from each of three luminance signals, wherein the three luminance signals and the first luminance signal are portions of a main luminance signal, wherein a sync block of a sync block header of the recording medium includes macro blocks that correspond with the image displayed such that macro blocks of the first data are mapped to the display image, left to right, from an X address of a start macro block and a Y address of the start macro block, and wherein the sync block header includes a picture class ID to indicate whether the search data is first data or second data.

36. An information reading apparatus for reading information recorded on a predetermined recording medium, said information reading apparatus comprising:

acquiring means for acquiring search data, which is composed of image data and control data, recorded on said recording medium; and display control means for controlling the display position of said image data on the basis of coordinate information contained in said control data, wherein said image data of said search data comprises first data sequentially followed on the recording medium by second data, wherein the first data includes a first macro block of discrete cosine components extracted from a first luminance signal, a second macro block of discrete cosine components extracted from a first color-difference signal, and a third macro block of discrete cosine components extracted from a second color-difference signal, and wherein the second data includes three macro blocks of discrete cosine components extracted from each of three luminance signals, wherein the three luminance signals and the first luminance signal are portions of a main luminance signal, wherein a sync block of a sync block header of the recording medium includes macro blocks that correspond with the image displayed such that macro blocks of the first data are mapped to the display image, left to right, from an X address of a start macro block and a Y address of the start macro block, and wherein the sync block header includes a picture class ID to indicate whether the search data is first data or second data.

37. An information reading apparatus according to claim 36, further comprising interpolation means for interpolating a display image by using said search data obtained by said acquiring means when said search data obtained by said acquiring means is less than the required amount of data for one screen of the display image.

38. An information reading method for use with an information reading apparatus for reading information recorded on a predetermined recording medium, said information reading method comprising:

an acquiring step for acquiring search data, which is composed of image data and control data, recorded on said recording medium; and a display control step for controlling a display position of said image data on the basis of coordinate information contained in said control data, wherein said image data of said search data comprises first data sequentially followed on the recording medium by second data, wherein the first data includes a first macro block of discrete cosine components extracted from a first luminance signal, a second macro block of discrete cosine components extracted from a first color-difference signal, and a third macro block of discrete cosine components extracted from a second color-difference signal, and wherein the second data includes three macro blocks of discrete cosine components extracted from each of three luminance signals, wherein the three luminance signals and the first luminance signal are portions of a main luminance signal, wherein a sync block of a sync block header of the recording medium includes macro blocks that correspond with the image displayed such that macro blocks of the first data are mapped to the display image, left to right, from an X address of a start macro block and a Y address of the start macro block, and wherein the sync block header includes a picture class ID to indicate whether the search data is first data or second data.

39. A recording medium having recorded thereon a computer-readable program for use in an information reading apparatus for reading information recorded on a predetermined recording medium, said program comprising:

an acquiring step for acquiring search data, which is composed of image data and control data, recorded on said recording medium; and a display control step for controlling a display position of said image data on the basis of coordinate information contained in said control data, wherein said image data of said search data comprises first data sequentially followed on the recording medium by second data, wherein the first data includes a first macro block of discrete cosine components extracted from a first luminance signal, a second macro block of discrete cosine components extracted from a first color-difference signal, and a third macro block of discrete cosine components extracted from a second color-difference signal, and wherein the second data includes three macro blocks of discrete cosine components extracted from each of three luminance signals, wherein the three luminance signals and the first luminance signal are portions of a main luminance signal, wherein a sync block of a sync block header of the recording medium includes macro blocks that correspond with the image displayed such that macro blocks of the first data are mapped to the display image, left to right, from an X address of a start macro block and a Y address of the start macro block, and wherein the sync block header includes a picture class ID to indicate whether the search data is first data or second data.

* * * * *